(12) United States Patent
Gordon et al.

(10) Patent No.: US 11,894,799 B2
(45) Date of Patent: Feb. 6, 2024

(54) SYSTEM FOR MOUNTING A SERVICE COMPONENT TO A BUILDING STRUCTURE

(71) Applicant: Solpod Pty Ltd, St. Kilda (AU)

(72) Inventors: Stuart Gordon, St. Kilda (AU); James Larratt, St. Kilda (AU); Jeremy Lawrence, St. Kilda (AU)

(73) Assignee: SOLPOD PTY LTD, St. Kilda (AU)

( * ) Notice: Subject to any disclaimer, the term of this patent is extended or adjusted under 35 U.S.C. 154(b) by 0 days.

(21) Appl. No.: 17/041,129

(22) PCT Filed: Mar. 26, 2019

(86) PCT No.: PCT/AU2019/050266
§ 371 (c)(1),
(2) Date: Sep. 24, 2020

(87) PCT Pub. No.: WO2019/183670
PCT Pub. Date: Oct. 3, 2019

(65) Prior Publication Data
US 2021/0119571 A1    Apr. 22, 2021

(30) Foreign Application Priority Data

Mar. 26, 2018 (AU) .............................. 2018901007

(51) Int. Cl.
*H02S 20/23* (2014.01)
*H02S 20/30* (2014.01)
(Continued)

(52) U.S. Cl.
CPC ............. *H02S 20/23* (2014.12); *H02S 20/30* (2014.12); *H02S 30/10* (2014.12); *H02S 30/20* (2014.12)

(58) Field of Classification Search
CPC .... H02S 20/30; H02S 20/20–26; H02S 40/10; H02S 20/10–32; H02S 30/00–20
See application file for complete search history.

(56) References Cited

U.S. PATENT DOCUMENTS

| | | | |
|---|---|---|---|
| 5,741,370 A | * | 4/1998 | Hanoka ............. B32B 17/10302 156/308.2 |
| 6,563,040 B2 | | 5/2003 | Hayden et al. |

(Continued)

FOREIGN PATENT DOCUMENTS

| | | |
|---|---|---|
| CN | 205681370 U | 11/2016 |
| CN | 205897596 U | 1/2017 |

(Continued)

OTHER PUBLICATIONS

Machine translation of WO2015/124810A9 (Year: 2015).*
International Search Report dated Aug. 7, 2019, issued in International Application No. PCT/AU2019/050266 (5 pages).

*Primary Examiner* — Ryan S Cannon
(74) *Attorney, Agent, or Firm* — Greer, Burns & Crain, Ltd

(57) ABSTRACT

A system for mounting a service component to a building structure has a plurality of elongate feet, and a plurality of connectors that each interconnect a respective one of the feet with the service component. Each foot is configured to affix to a surface of the building structure and then to resist disengagement from that surface. The connectors each interconnect a respective one of the feet with the service component, and secure the relative position of the respective foot and the service component. An elongate beam can be connected or connectable to the service component, such that in the installed system the beam is to be positioned to extend obliquely across the feet.

24 Claims, 34 Drawing Sheets

(51) Int. Cl.
*H02S 30/10* (2014.01)
*H02S 30/20* (2014.01)

(56) References Cited

U.S. PATENT DOCUMENTS

| | | |
|---|---|---|
| 2008/0264467 A1 | 10/2008 | Doko |
| 2011/0253193 A1 | 10/2011 | Korman et al. |
| 2012/0222372 A1* | 9/2012 | Hilber .................. F24S 25/617 |
| | | 52/173.3 |
| 2012/0285515 A1* | 11/2012 | Sagayama ............... F24S 25/13 |
| | | 136/251 |
| 2014/0020731 A1* | 1/2014 | Levi ........................ F24S 25/12 |
| | | 136/245 |
| 2017/0279403 A1* | 9/2017 | Seery ...................... H02S 20/23 |
| 2017/0294873 A1* | 10/2017 | Mori ..................... F24S 25/634 |
| 2021/0111665 A1* | 4/2021 | Van De Sande ........ H02S 20/10 |

FOREIGN PATENT DOCUMENTS

| | | | |
|---|---|---|---|
| DE | 202010015817 U1 * | 3/2011 | ............. F24J 2/4614 |
| WO | WO-2015124810 A9 * | 10/2015 | ........... H01L 31/043 |

* cited by examiner

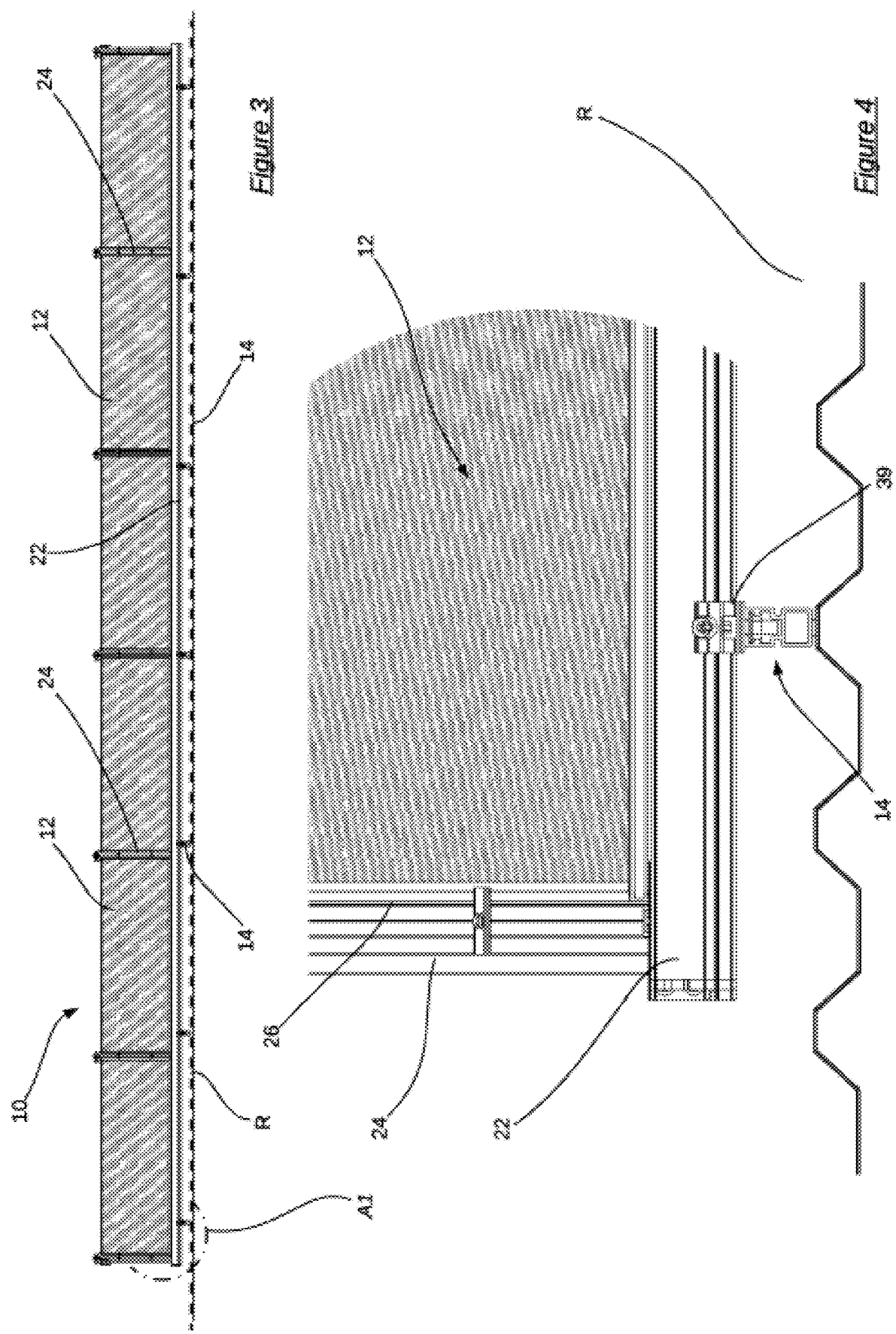

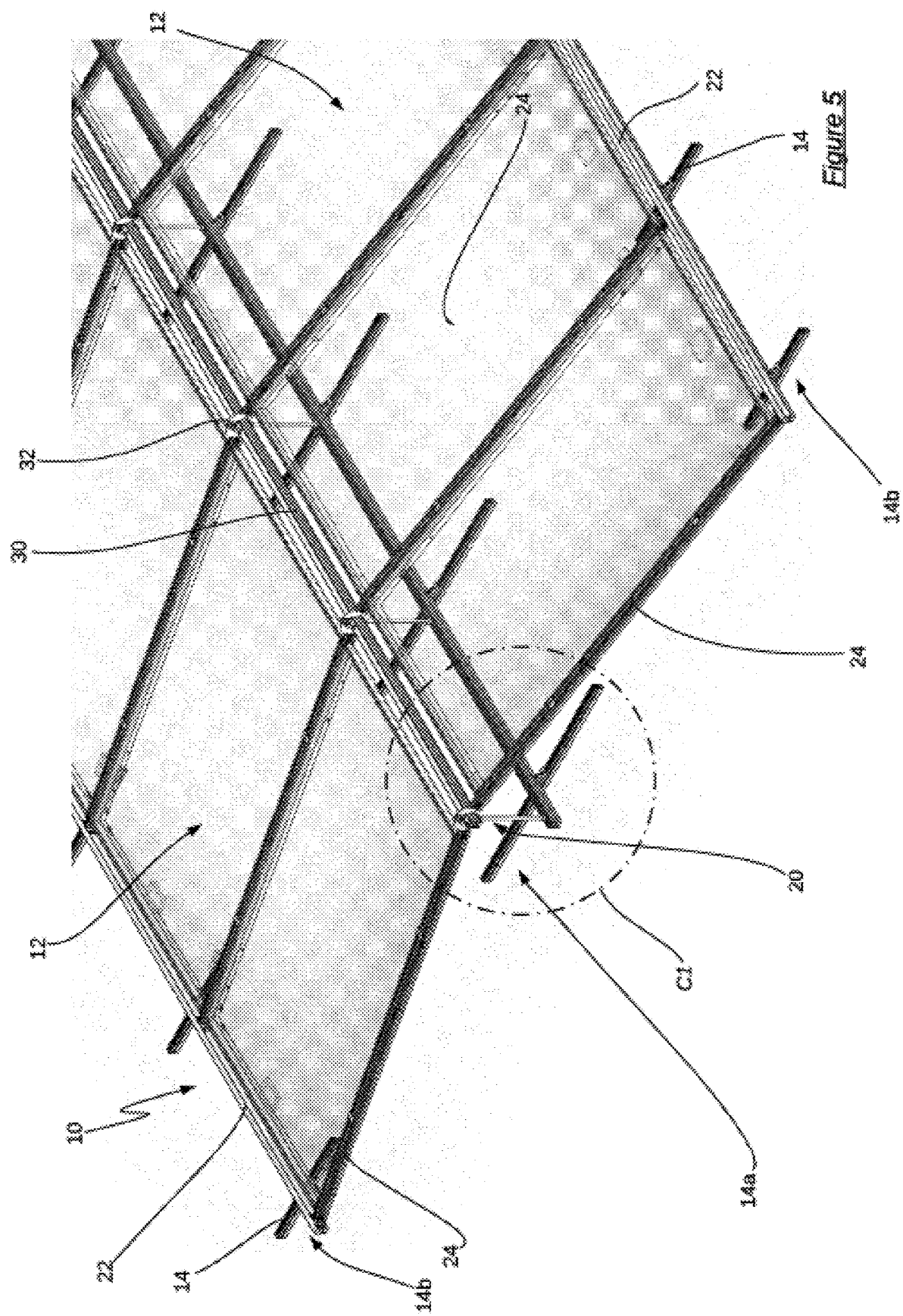

SYSTEM FOR MOUNTING A SERVICE COMPONENT TO A BUILDING STRUCTURE

CROSS-REFERENCE TO RELATED APPLICATIONS

This application claims benefit of PCT/AU2019/050266 filed Mar. 26, 2019, which claims benefit of Australian Patent Application No. 2018901007, filed Mar. 26, 2018, each of which is incorporated by reference in its entirety.

FIELD OF THE INVENTION

The present invention relates to a system for mounting a service component to a building structure, and a method of installing a service component to a building structure. The present invention also relates to a solar photovoltaic assembly and system, and a method of installing a solar photovoltaic system on the external surface of a building.

BACKGROUND

It is known to mount service components (such as solar photovoltaic modules, communications transmission equipment, hot water units, and/or solar water heaters) to a building structure. Such service components can be mounted externally or internally of the building. By way of example, solar photovoltaic modules and solar water heaters are commonly mounted externally of a building, and typically on the roof.

With particular reference to solar photovoltaic modules, the roof is a part of the building with typically the least overshadowing, and causes the least intrusion into usable space surrounding the building. Consequently, Installing roof mounted service components, such as solar photovoltaic modules, comes with a number of challenges due to many factors. The design and installation costs impact the commercial justification for proceeding with an installation. In the example of solar photovoltaic modules, the design and capacity of the system are influenced by the characteristics of the building at the installation site (and particularly those of the roof), the size of each photovoltaic module within the array, and the mounting system that is used to mount the module on the roof. Further, when completing the installation, appropriate weather conditions are required for safe installation, and inclement weather can delay an installation, which results in lost work costs.

Roof mounted solar photovoltaic systems for commercial buildings commonly require a uniquely engineered solution to appropriately manage the weight of the modules and mounting system for the structural capacity of the roof, having regard to the roofing structure and materials. To maximize the energy yield, the size, shape, orientation, slope, and height of the roof must also be considered.

An additional factor that can inhibit the installation of a solar photovoltaic system is that it is the building users that derive the financial benefits from a system, but as a fixture of the building the installation costs are typically incurred by the building owner. In many circumstances where the users are not the owners, there is reluctance from both the building owners and users (in other words, the landlord and tenant) to invest in installing a system.

There is a need to address the above, and/or at least provide a useful alternative.

SUMMARY

There is provided a system for mounting a service component to a building structure, the system comprising:
  a plurality of elongate feet, each of which being configured to affix to a surface of the building structure and then to resist disengagement from that surface; and
  a plurality of connectors that each interconnect a respective one of the feet with the service component, and secure the relative position of the respective foot and the service component.

Preferably, the feet and connectors are configured to interconnect such that the position of each connector with respect to the corresponding foot is adjustable in a direction parallel to the elongate direction of the respective foot.

There is provided a system for mounting a service component to a building structure, the system comprising:
  a plurality of elongate feet, each of which being configured to affix to a surface of the building structure and then to resist disengagement from that surface;
  at least one elongate beam that is connected or connectable to the service component, wherein in the installed system the beam is to be positioned to extend obliquely across the feet; and
  a plurality of joiners that each interconnect a respective one of the feet with the beam, and secure the relative position of the respective foot and the beam.

Preferably, the feet and joiners are configured to interconnect such that the position of each joiner with respect to the corresponding foot is adjustable in a direction parallel to the elongate direction of the respective foot.

In some embodiments, each joiner interconnects with the respective foot and the beam in a manner that permits non-orthogonal positioning of respective foot and the beam.

Alternatively or additionally, the joiners are configured to interconnect with the beam such that the position of each joiner with respect to the beam is adjustable in a direction parallel to the elongate direction of the beam.

In at least some embodiments, each joiner includes at least one clamping portion that releasably clamps onto one of the beam or a respective foot. Preferably, the beam or the respective foot includes a trapezoidal profile, and the joiner clamps onto the trapezoidal profile.

Preferably, each foot has adhesive material that is to affix to the surface of the building. More preferably, the foot includes a piece of compressible foam, and the adhesive material is disposed on an underside surface of the compressible foam.

There is also provided a solar photovoltaic assembly comprising:
  one or more solar photovoltaic modules; and
  a support structure on which the modules are mounted, the support structure including a plurality of feet that are each configured to affix to an external surface of a building and then to resist disengagement from that external surface.

There is also provided a solar photovoltaic assembly comprising:
  a plurality of solar photovoltaic modules that are arranged into at least two sets, with each set having one or more of the modules; and
  a support structure on which the modules are mounted, the support structure including:
    at least one central support portion, the sets of photovoltaic modules being mounted to the support structure so as to be movable relative to the central support portion between a stowed configuration in which the sets are positioned with at least one edge of each set being disposed adjacent a peripheral edge of another set, and a deployed configuration in which the photovoltaic modules are arranged relative to one another so as to capable of simultaneously receiving solar energy; and a plurality of feet, each of which being configured to affix to an external surface of a building and then to resist disengagement from that external surface, a first subset of the feet being provided to affix the central support portion to the external surface of the building, and one or more second subsets of the feet, each second subset of feet being spaced from the first subset and arranged to affix a respective one of the sets of modules to the building.

In some embodiments, the plurality of feet are elongate, and the support structure further comprises:

an elongate central beam that is connected or connectable to the central support portion, wherein in the installed assembly the central beam is to be positioned to extend obliquely across the first subset of the feet;

one or more elongate beams outer that are each connected or are connectable to one of the sets of modules at a location spaced from the central beam, wherein in the installed assembly each outer beam is to be positioned to extend obliquely across a respective one of the second subsets of the feet; and a plurality of joiners that each interconnect a respective one of the feet with a respective one of the beams, and secure the relative position of the respective foot and beam.

In certain embodiments, the central support portion defines one or more pivot axes, and each set is mounted to the central support portion so as to rotate about a respective one of the pivot axes when moving between the collapsed and deployed configurations. Preferably, each set rotates at least 90° about its respective pivot axis when moving between the collapsed and deployed configurations. More preferably, each set rotates through approximately 100° about its respective pivot axis when moving between the collapsed and deployed configurations. Preferably, the assembly has a single pivot axis and the sets are mounted to the central support portion so as to rotate about the pivot axis when moving between the collapsed and deployed configurations.

The central support portion can include a generally elongate central member that is disposed between the sets of modules. Preferably, the generally elongate central member is disposed between inner edges of the sets of modules.

In certain embodiments, each foot has an underside surface that is shaped to match a complementary shaped portion of the surface of the building. Preferably, the underside surface of each foot has a generally concave portion. In certain embodiments, the underside surface of each foot has a generally elongate inverted channel shape.

In some embodiments, each foot can be rotatable relative to the modules to align the underside surface with a complementary shaped portion of the surface of the building to which that foot is to be affixed.

Preferably, each foot has adhesive material that is to affix to the surface of the building. More preferably, the foot includes a piece of compressible foam, and the adhesive material is disposed on an underside surface of the compressible foam.

Preferably, when the sets of modules are in the deployed configuration and the second subsets of feet are affixed to the external surface of the building, each foot in the second subsets of feet provides support to one of the sets the modules.

Alternatively or additionally, the support structure includes an outer support portion for each set of modules, wherein:

each outer support portion is spaced from the central support portion, each foot in the second subsets of feet is connected to a respective one of the outer support portions.

In some embodiments, the outer support portions of the support structure includes the outer beams.

In some embodiments, each foot in the first subset of feet is longer than each foot in the second subsets of feet.

In at least some embodiments, the sum of the lengths of all feet within the first subset of feet is at least 80% of the length of the assembly in the direction parallel to the centre support portion. Preferably, the sum of the lengths of all feet within the first subset of feet is at least 90% of the length of the assembly in the direction parallel to the centre support portion. More preferably, the sum of the lengths of all feet within the first subset of feet is approximately 97.5% of the length of the assembly in the direction parallel to the centre support portion.

In at least some embodiments, the sum of the lengths of all feet within each second subset of feet is at least 40% of the length of the assembly in the direction parallel to the respective outer support portion. Preferably, the sum of the lengths of all feet within each second subset of feet is at least 50% of the length of the assembly in the direction parallel to the respective outer support portion. More preferably, the sum of the lengths of all feet within each second subset of feet is approximately 54% of the length of the assembly in the direction parallel to the respective outer support portion.

The support structure can further include spars that are each pivotally connected at an inner end to the central support portion and at an outer end to either: the feet, or one of the outer support portions.

In at least some embodiments, the assembly has two sets of modules. Preferably, the assembly has two pivot axes that are parallel and spaced apart with respect to each other, and each set pivots about a respective one of the pivot axes when moving between the deployed and stowed configurations.

The support structure is preferably configured so that the assembly adopts a general A-frame arrangement when the sets are in the deployed configuration. Preferably, the internal pitch angle of the structure when in the deployed configuration is less than 20°. More preferably, the internal pitch angle of the structure when in the deployed configuration is approximately 10°.

In at least some embodiments, the support structure includes a plurality of lifting points for connection to lifting equipment during installation of the assembly. Preferably, the lifting points are positioned so that when the assembly is in the stowed configuration, the centre of gravity of the assembly is below the lifting points. More preferably, when the assembly is in the stowed configuration, the lifting points and the first subset of feet are on opposing sides of the assembly.

In some embodiments, each module has:

a structural sheet member, and the photovoltaic cells of that module are supported on the structural sheet member, and a mounting frame that extends around the periphery of the structural sheet member, wherein the mounting frames of the modules are connected to the support structure.

In embodiments in which the support structure includes spars, the mounting frames can be secured to the spars.

In at least some alternative embodiments, the mounting frames of the modules can be connected to the central support portion and/or the outer support portions.

In some further alternative embodiments, each module has a structural sheet member and the photovoltaic cells of that module are supported on the structural sheet member, and wherein the structural sheet member is pivotally connected to the central support portion. In such embodiments, the connected structural sheet members can be connected to the subsets of outer feet or the outer support portions.

In some embodiments, the support structure includes a plurality of central legs, and each central leg has an upper end that is connected to the central support portion, and a lower end that is connected to the central beam. In certain alternative embodiments, the support structure can include a plurality of central legs, and each central leg has an upper end that is connected to the central support portion and a lower end that is connected to one of the feet in the first subset of feet. In some embodiments, each of the central legs is detachably connected to the central support portion.

The connection between the upper end of each central leg and the central elongate member may allow for relative movement between the respective leg and the central elongate member in a plane that is generally perpendicular to the central leg. Alternatively or additionally, the connection between the lower end of each central leg and the respective foot may allow for relative movement between the respective leg and foot in a plane that is generally perpendicular to the central leg.

In some embodiments, the connections between the upper end of central legs and the central elongate member may allow for adjustment of the position of each central leg relative to the central elongate member.

The support structure can include a plurality of outer connectors that each interconnect one of the outer support portions with one of the feet in the second subsets of feet. In some embodiments, each of the outer connectors is detachably connected to a respective one of the outer support portions.

Preferably, the connection between each outer connector and the respective foot allows for relative movement between the outer connector and foot in a plane that is generally parallel to the outer support portion.

The present invention also provides a solar photovoltaic system comprising:
 a plurality of solar photovoltaic assemblies as previously described, each assembly being affixed to an external surface of a building; and
 an electrical system that includes electrical conduits that interconnect the assemblies, and one or more electrical conduits to distribute harvested electrical energy to another electrical system.

The present invention also provides a method of installing a solar photovoltaic system on a surface of a building, the method involving providing at least one solar photovoltaic assembly as previously described, and for each assembly:
 locating the feet in contact at the intended installation position on the surface of the building;
 affixing the feet to the surface;
 with the assembly in the stowed configuration, bringing the assembly towards the feet;
 connecting the central beam of the support structure to the first subset of feet;
 moving the sets of modules into the deployed configuration; and
 connecting the outer beams of the support structure to the second subsets of feet, thereby affixing the assembly to the building with the sets of modules in the deployed configuration.

The present invention also provides a method of installing a solar photovoltaic system on a surface of a building, the method involving providing at least one solar photovoltaic assembly as previously described, and for each assembly:
 with the sets of photovoltaic modules in the stowed configuration, bringing the sets of photovoltaic modules towards the intended installation position of the assembly;
 placing the first subset of feet in contact with the external surface;
 affixing the first subset of feet to the external surface of the building;
 moving the sets of modules into the deployed configuration; and
 affixing the or each second subset of feet to the external surface of the building, thereby affixing the assembly to the building with the sets of modules in the deployed configuration.

In at least some embodiments, the step of affixing the first subset of feet to the external surface of the building precedes the step of bringing the assembly towards its intended installation position. Further, the step of moving the sets of modules into the deployed configuration can occur after the step of affixing the or each second subset of feet to the external surface of the building.

Preferably, the support structure includes a plurality of lifting points, and the method further involves connecting lifting equipment to the lifting points, and the step of bringing the assembly towards its intended installation position involves suspending the assembly above the ground from the lifting points.

In some embodiments, the method further involves:
 providing a plurality of joiners;
 interconnecting each of the feet with a respective one of the central or outer beams; and
 securing the relative position of the respective foot and beam using the joiners.

In some alternative embodiments, the step of placing the first subset of feet in contact with the external surface of the building involves lowering the assembly. Preferably, the steps of placing the first subset of feet in contact with the external surface of the building and affixing the first subset of feet to the external surface of the building occur simultaneously.

The step of moving the sets of modules into the deployed configuration preferably involves lowering the lifting points relative to the central support portion.

In embodiments in which each foot has adhesive material that is to affix to the surface of the building, the method can involve applying the adhesive material to the underside surface of each foot. Alternatively or additionally, the method can further involve removing a release liner from the adhesive material prior to affixing the respective foot to the surface of the building. Alternatively or additionally, the method can further involve preparing the surface of the building at the installation site to maximize the adhesion between the surface and each foot prior to affixing the respective foot to the surface of the building. Preparing the surface can involve any one or more of:
 cleaning the surface to remove dirt and/or other contaminating material;
 abrading the surface to introduce surface imperfections; and
 applying a primer to the surface.

BRIEF DESCRIPTION OF THE DRAWINGS

In order that the invention may be more easily understood, embodiments will now be described, by way of examples only, with reference to the accompanying drawings, in which:

FIG. 3: is a right side view of the photovoltaic assembly of FIG. 1;

FIG. 4: is an enlarged view of Region A1 in FIG. 3;

FIG. 5: is a partial perspective view of the photovoltaic assembly of FIG. 1, in which the modules are shown partially transparent;

DETAILED DESCRIPTION

FIGS. 1 to 14, and 20 show a solar photovoltaic assembly 10 according to an embodiment of the invention. The assembly 10 of this embodiment has twelve solar photovoltaic modules 12, and a support structure on which the modules 12 are mounted.

Figure 22:
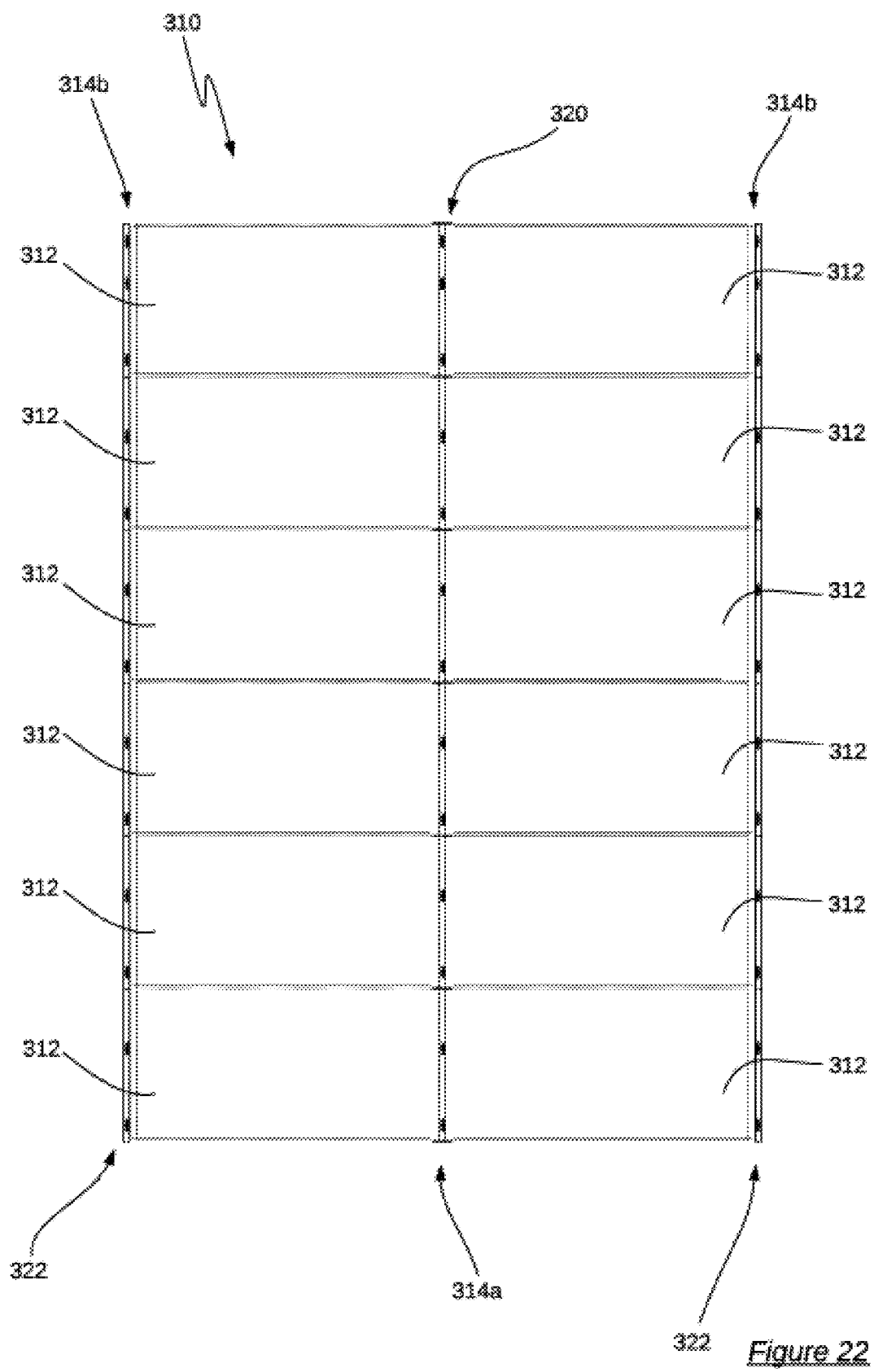
FIG. 22: is a plan view of a roof mountable solar photovoltaic assembly according to a fourth embodiment of the present invention.
Figure 23:
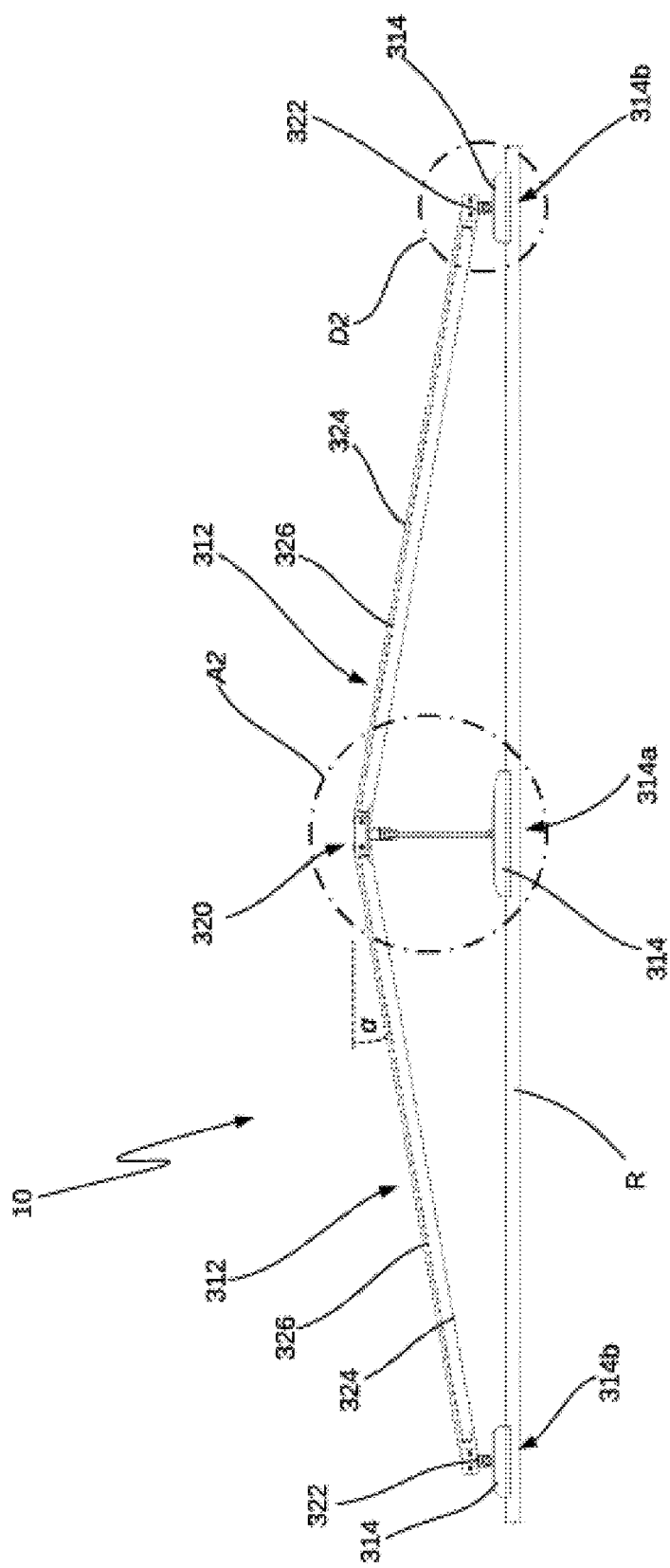
FIG. 23: is an end view of the photovoltaic assembly of FIG. 22, showing the assembly in a deployed configuration.

In this particular embodiment, the modules 12 are arranged into two sets of six modules 12. Each of the two sets are arranged with the six modules 12 in a rectangular array. As will be seen particularly from FIG. 22, the modules 12 in each set are also arranged in a linear array; in other words, the modules 12 in each set are set out in a single row.

The support structure of the assembly 10 includes feet 14 that are each configured to affix to a surface of a building, such as the external surface of a roof R as shown schematically in FIG. 4. Further, once the feet 14 are affixed to a surface, each foot 14 resists disengagement from that surface. In the particular example illustrated in FIGS. 3, 4 and 6, the external surface is a roof R that is formed of profiled steel sheet material. The profile of the sheet material has ridges and valleys, and the feet 14 are affixed to the ridges.

It will be particularly evident from the description that follows and FIG. 4 that affixing the feet 14 to the roof R does not involve piercing or otherwise penetrating the external surface of the roof R. This is particularly advantageous because the installation of the assembly 10 does not require any holes to be formed, or any throughways to be made, through which to pass components of the support structure. Consequently, the integrity of the roof R is not compromised when installing the assembly 10. There is then no need to seal holes or throughways in the roof structure during installation. Should the assembly 10 be decommissioned and removed from the building, there are no holes or throughways to close/repair and seal.

Figure 7:
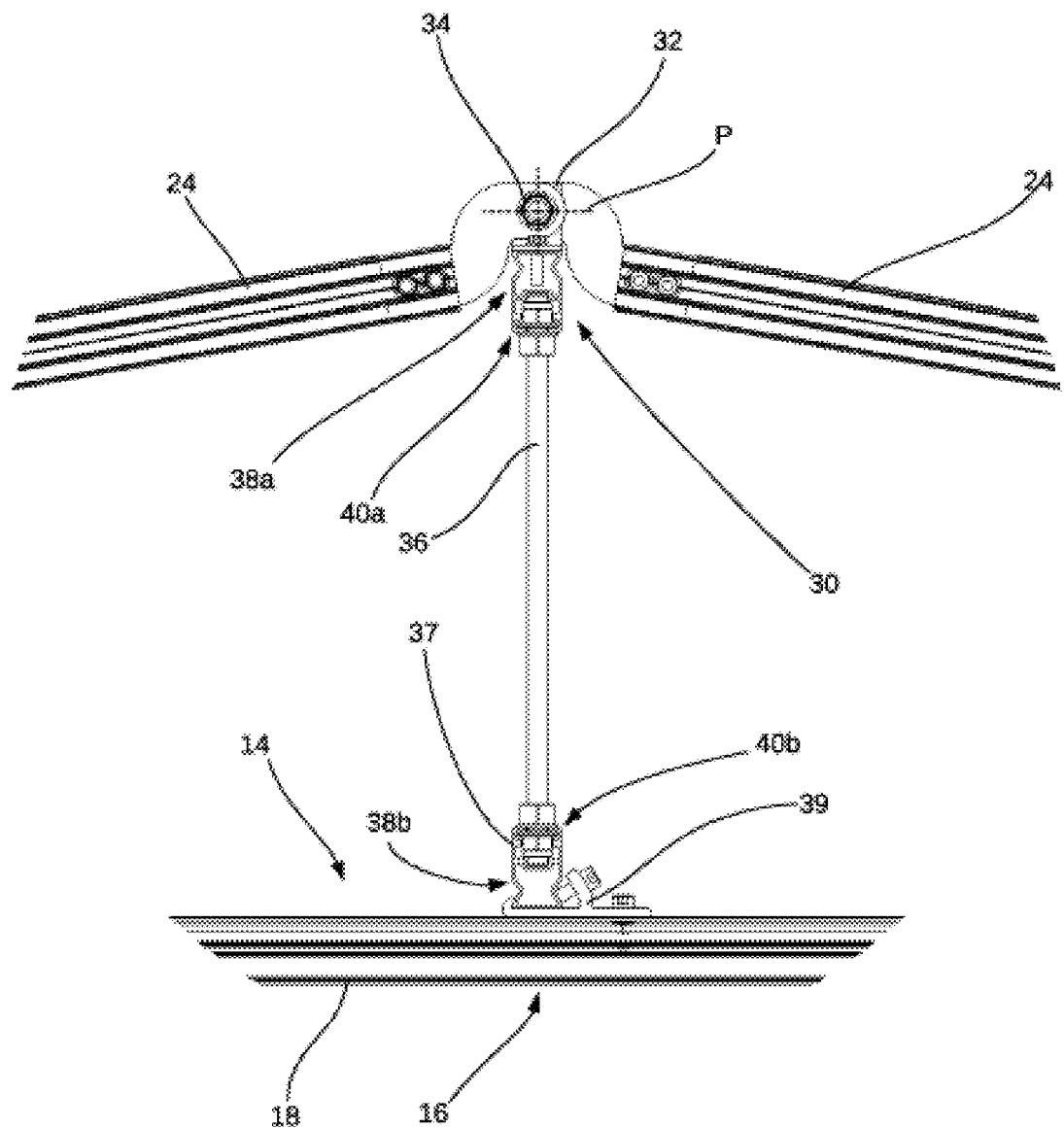
FIG. 7: is an enlarged view of Region B1 in FIG. 6.
Figure 8:
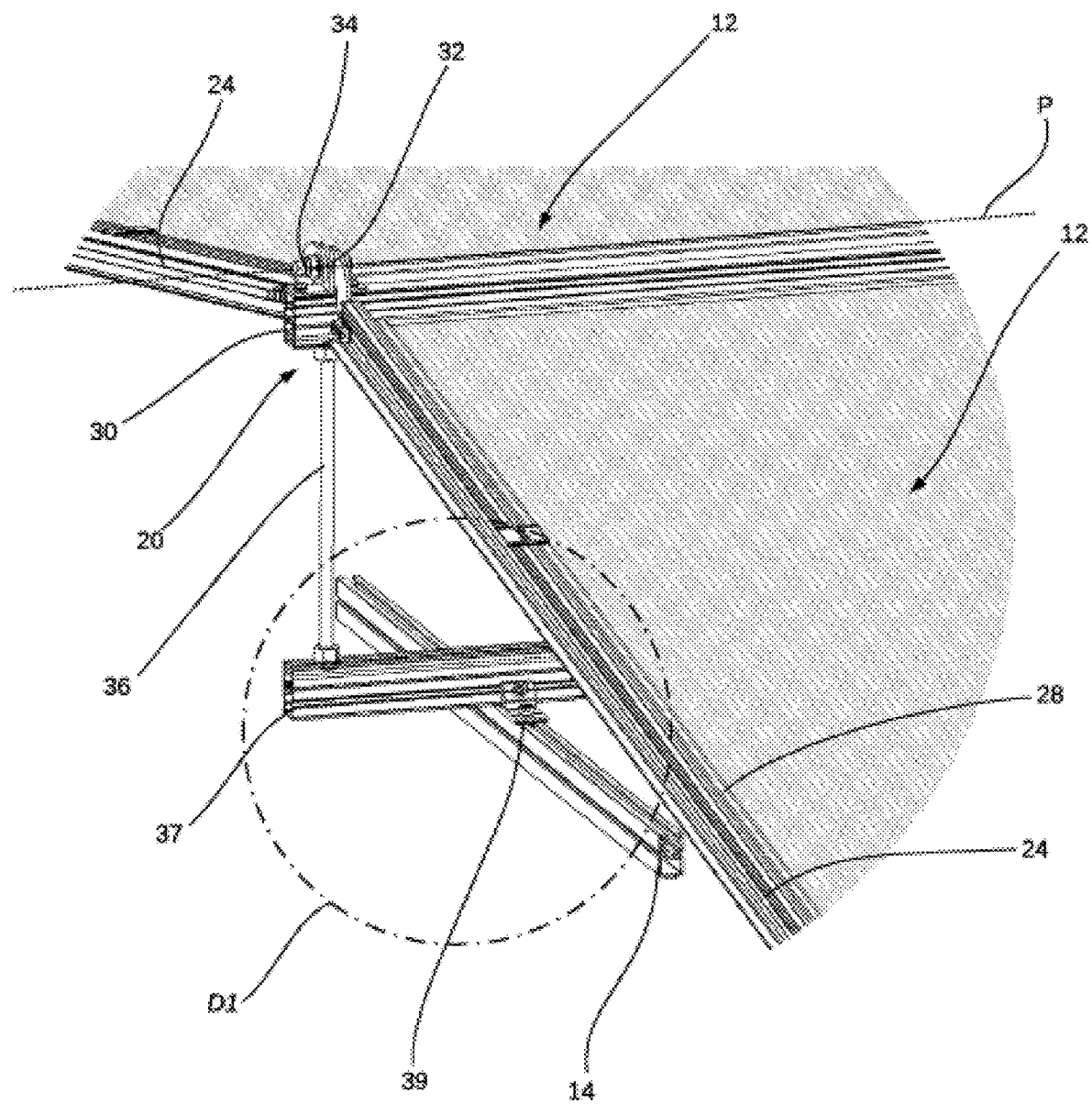
FIG. 8: is an enlarged view of Region C1 in FIG. 5.
Figure 9:
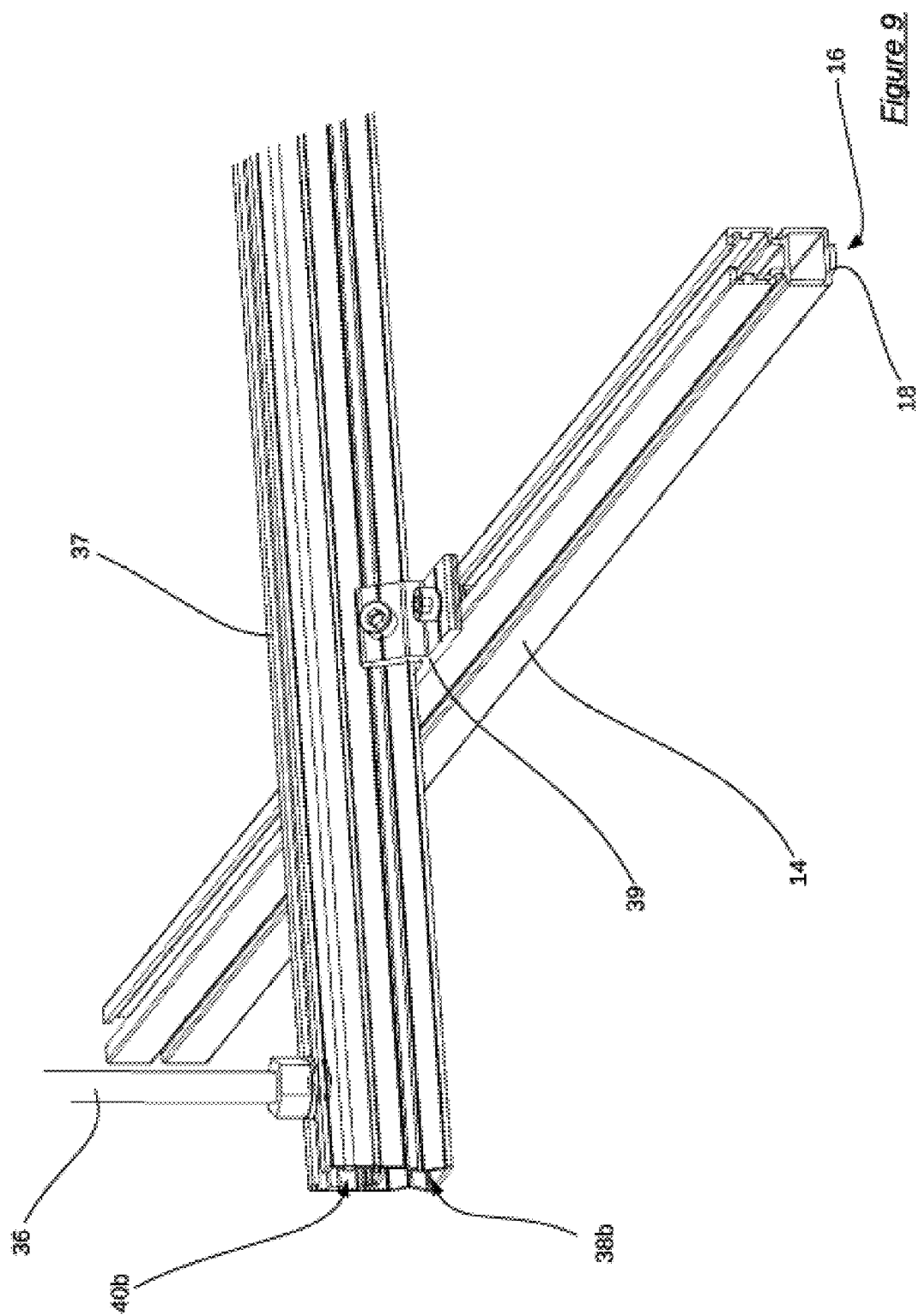
FIG. 9: is an enlarged view of Region D1 in FIG. 8.
Figure 10:
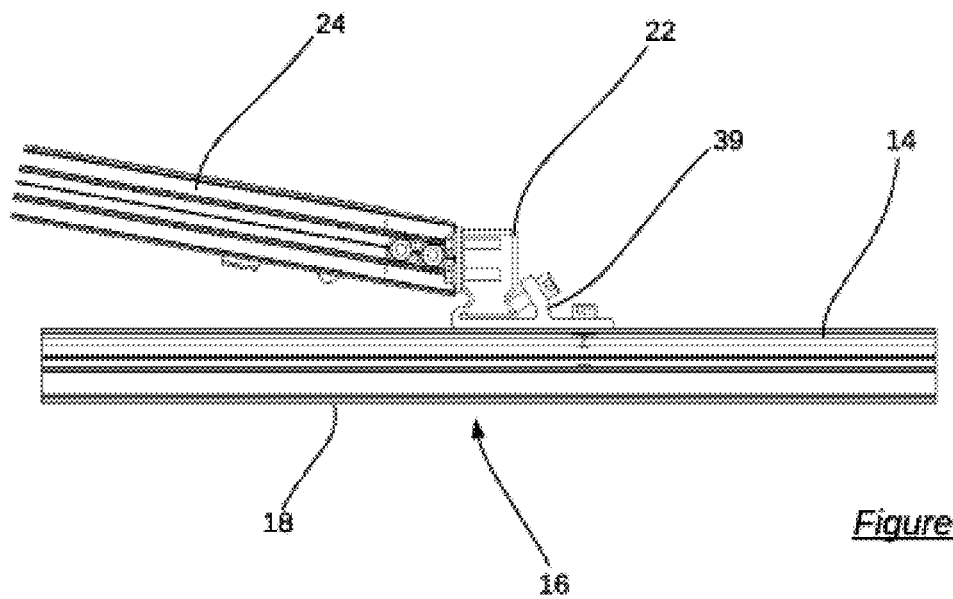
FIG. 10: is an enlarged view of Region E1 in FIG. 6.
Figure 11:
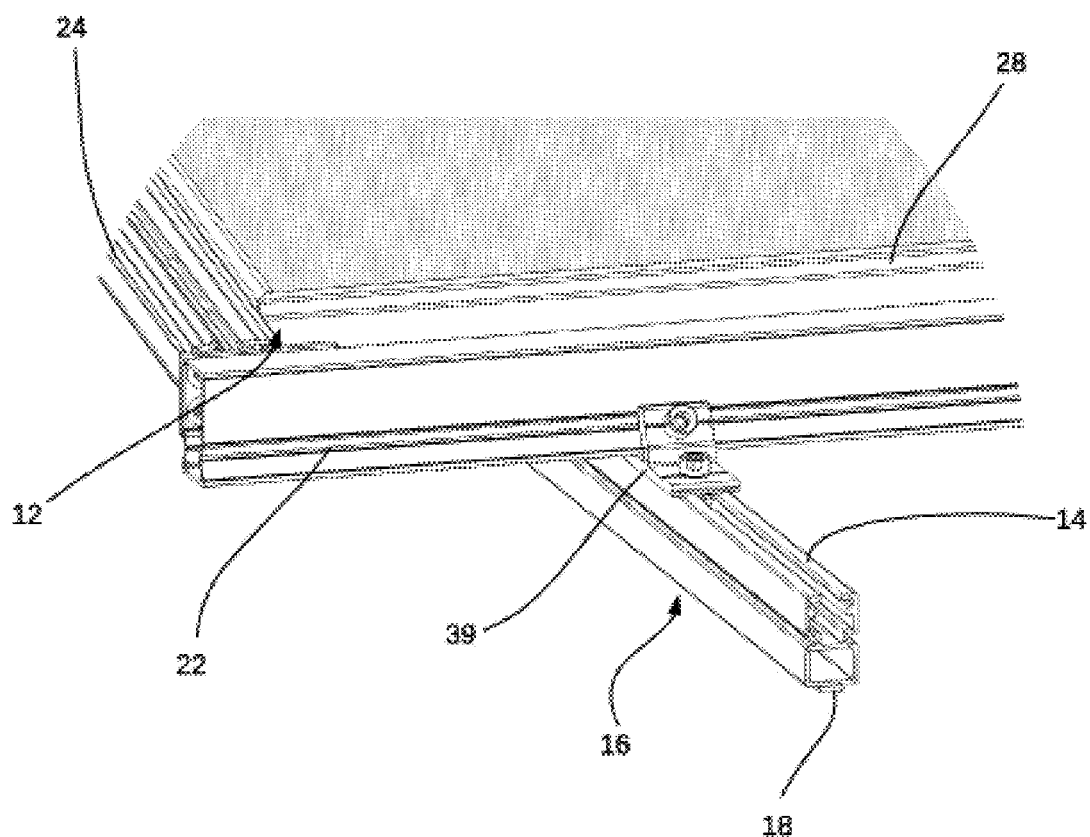
FIG. 11: is a perspective view of Region E1 in FIG. 6.
Figure 12:
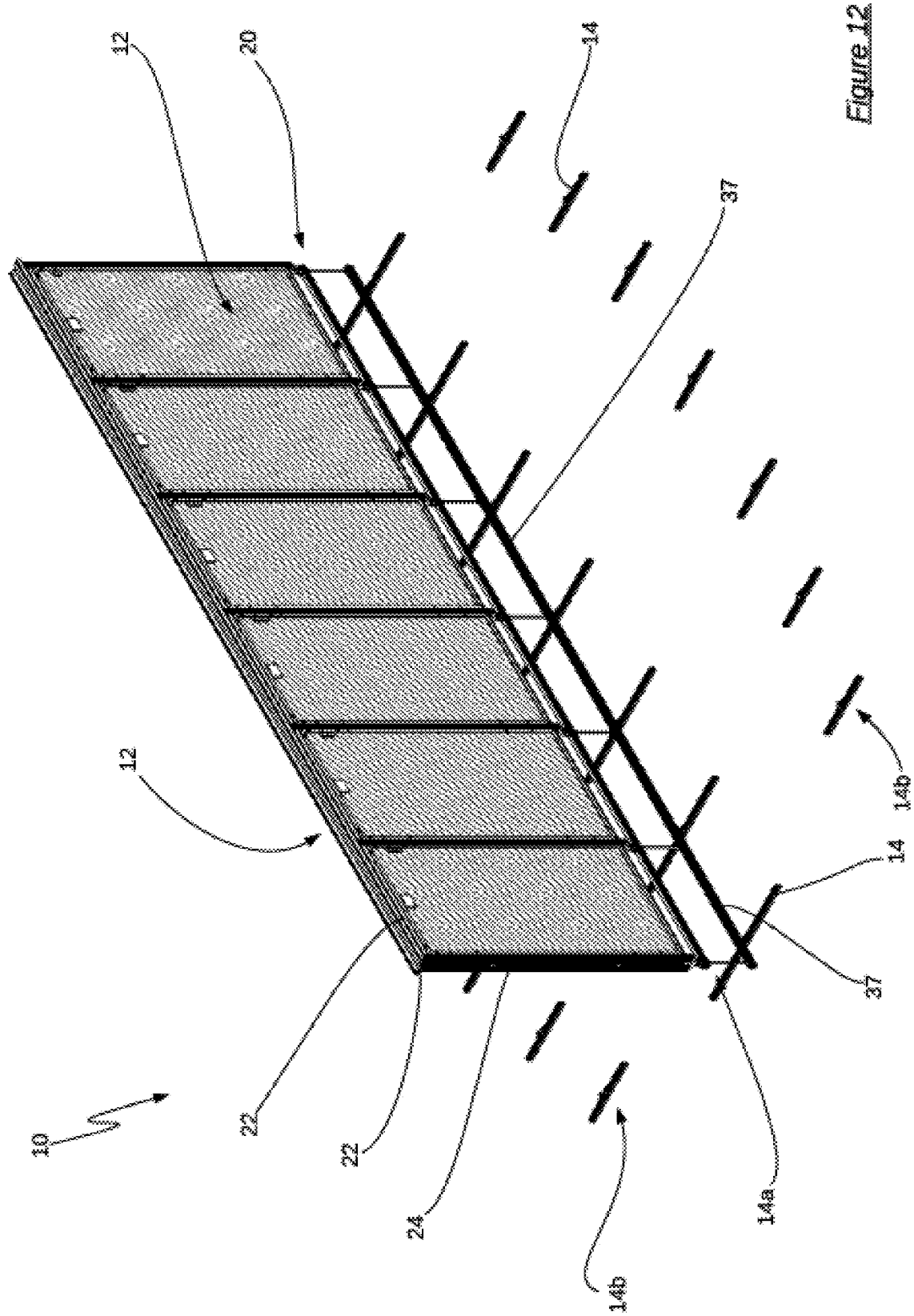
FIG. 12: is a perspective view of the roof mountable solar photovoltaic assembly of FIG. 1, showing the assembly in a stowed configuration.

As shown particularly in FIGS. 7 and 10, in this embodiment, each foot 14 has an underside surface 16. Compressible foam 18 affixes the feet 14 to the roof R. The foam 18 has adhesive applied to both sides of the foam 18; on an upper side to adhere the foam 18 to the underside surface 16, and on the opposing lower side to be used to adhere the foam 18 to the external surface of the roof R. Thus, the underside 16 of each foot 14 is affixed to the surface of the roof R by a piece of compressible foam 18. In this way, the support structure is affixed to the roof R by the feet 14. The compressibility and flexibility of the foam 18 enables to foam to deform around minor surface imperfections in the underside surface 16 and the external surface of the roof R. Consequently, the contact area between the foam 18 and the feet 14/roof R is maximized.

Once the foot 14 has been affixed to the roof surface, the adhesive material on the foam 18 resists disengagement of the respective foot 14 from that surface. To this end, the adhesive material resists disengagement of the respective foot 14 caused by tension acting perpendicularly to the underside surface 16 and external surface of the roof R; in other words, disengagement by forces acting perpendicularly to the underside surface 16 and roof R and in a direction so as to separate the foot 14 and roof R. The adhesive material also resists disengagement of the respective foot 14 caused by shear forces acting parallel to the underside surface 16 and external surface of the roof R.

Affixing the feet 14 to the ridges of profiled sheet material has a number of benefits. These include that the ridges tend to have greater structural rigidity, which increases the stability of the assembly 10 when subjected to external loads; and that the assembly 10 is installed in a manner that has minimal interference with the passage of water and/or small debris (such as leaves) across the roof surface.

In this particular embodiment, the support structure includes a central support portion 20, two outer support portions (which in this embodiment are in the form of outer beams 22), and spars 24. The inner end of each spar 24 is pivotally connected to the central support portion 20. The outer end of each spar 24 is rigidly connected to a respective one of the outer beams 22. Each module 12 has a structural sheet member 26, and a mounting frame 28 that extends around the periphery of the structural sheet member 26. The photovoltaic cells of the modules are supported on the structural sheet member 26. The mounting frames 28 of the modules 20 are connected to the spars 24 of the support structure. Further, a spar 24 is connected on each side of each module 20. In this embodiment, seven spars 24 are provided for each set of modules 12.

In this example, the central support portion 20 includes a generally elongate central member 30 that is disposed between the sets of modules 12. In particular, the central member 30 is positioned between the inner edges of the two sets of modules 12. The central support portion 20 also includes transverse brackets 32 (shown most clearly in FIG. 8) that are secured to the central member 30. Each spar 24 is pivotally connected to a respective one of the transverse brackets 32. To this end, the spars 24 are connected to the transverse brackets 32 by mounting bolts 34. The shanks of the mounting bolts 34 are axially aligned so as to define a pivot axis P for the sets of modules 12. As the spars 24 are connected to the modules 12 in the respective set, the spars 24 and modules 12 in each set rotate as a unit around the pivot axis P.

By virtue of the pivotable connections, the sets of modules 12 are each movable relative to the central support portion 20. The assembly 10 can be arranged with the sets of modules 12 in a deployed configuration (shown in FIGS. 1, 2, 5 and 6) in which the photovoltaic modules 12 are arranged relative to one another so as to capable of simultaneously receiving solar energy. To this end, in the arrangement shown in FIGS. 1 and 2, all twelve modules 12 of the assembly 10 are able to receive solar energy simultaneously. As will be understood, the ability of all twelve modules 12 to receive solar energy simultaneously may be inhibited by overshadowing, appropriate placement of the assembly, and/or the relative angle of the sun.

Figure 13:
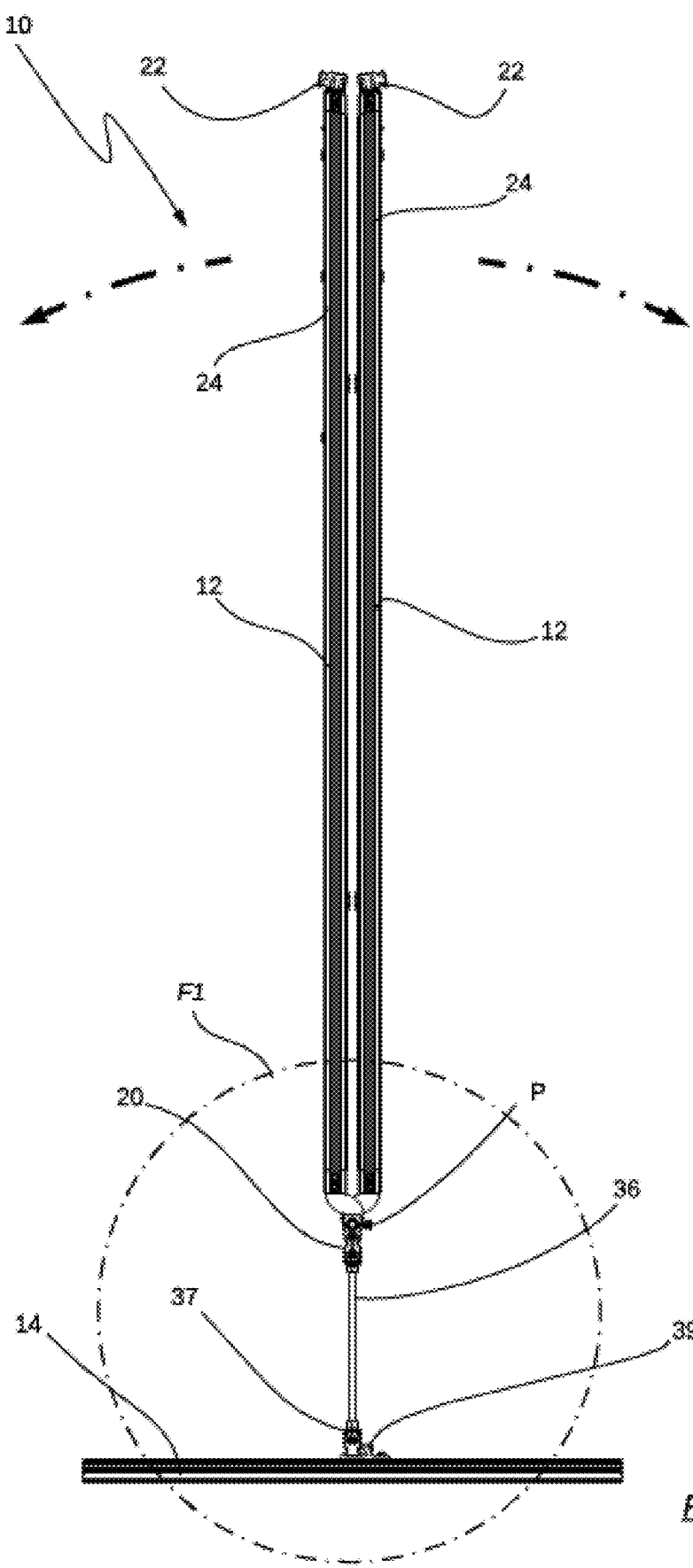
FIG. 13: is a partial end view of the photovoltaic assembly as illustrated in FIG. 12.
Figure 14:
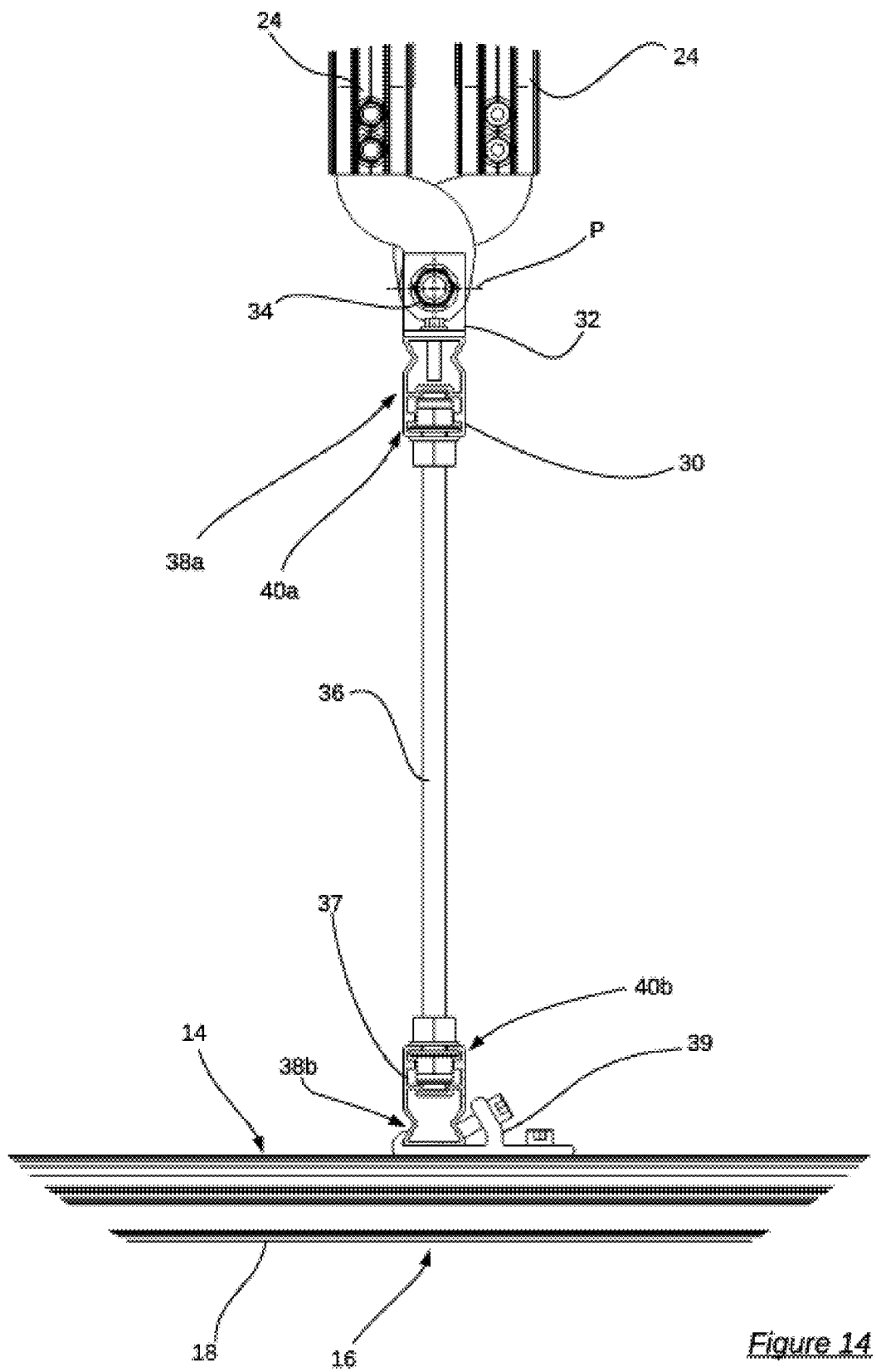
FIG. 14: is an enlarged view of Region F1 in FIG. 13.

The two sets of modules 12 can also assume a stowed configuration (shown in FIGS. 12 to 14) in which the sets are position with at least one edge of each set being disposed adjacent a peripheral edge of another set. In this particular embodiment, when the assembly 10 is in its stowed configuration, the two outer beams 22 are adjacent one another. FIG. 13 indicates the direction of rotation of each of the two sets of modules 12 about the pivot axis P, when moving from the stowed configuration towards the deployed configuration.

In the stowed configuration, at least some of the photovoltaic cells of the modules 12 face towards another component part of the assembly 10. As will be apparent from FIGS. 12 and 13, when the assembly 10 is in its stowed configuration, for each set of modules 12, vectors normal to the plane of the modules 12 are oriented towards the modules 12 in the other set. Consequently, at least some of the modules 12 are prevented from receiving solar energy in the stowed configuration.

As will be appreciated, when the assembly 10 is in the deployed configuration with all feet 14 affixed to an external surface of a building as previously described, it would be necessary to detach (or otherwise disconnect) feet 14 from that external surface in order to then move the assembly 10 from the deployed configuration to the stowed configuration.

A first subset of the feet 14 affix the central support portion to the external surface of the roof R. Two second subsets of the feet 14 affix the two outer beams 22 to the external surface of the roof R. In the Figures, the first subset of feet 14 are indicated by reference numeral 14*a*, and each of the second subsets of feet are indicated by reference numeral 14*b*. As is evident from the Figures, the first and second subsets 14*a*, 14*b* of feet 14 lie on parallel spaced apart lines. Each of the second subsets 14*b* are spaced from the first subset 14*a*. In this particular example, the assembly 10 has twenty one feet; seven feet in each subset of feet 14.

Figure 6:
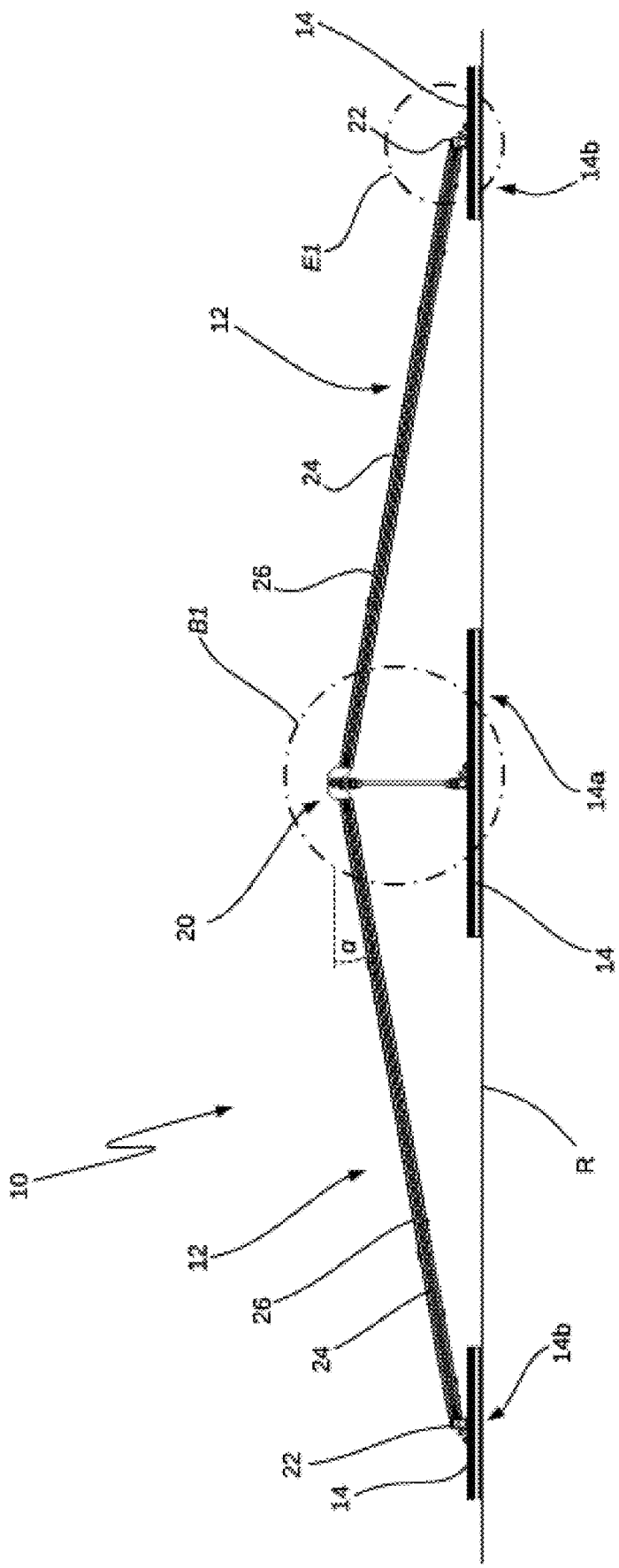
FIG. 6: is an end view of the photovoltaic assembly of FIG. 1, showing the assembly in a deployed configuration.

As will be observed from FIG. 6, the length of each foot 14 in the first subset 14*a* is longer than the length of each foot 14 in the second subset 14*b*.

The size and number of feet 14 have the advantage of spreading the loads imparted to the roof R over a large area. In addition, utilizing the ribs of the roofing material has the benefit of applying these loads to the portion of the roof R with highest structural strength avoids the need to pierce the roof R with any part of the support structure.

Figure 24:
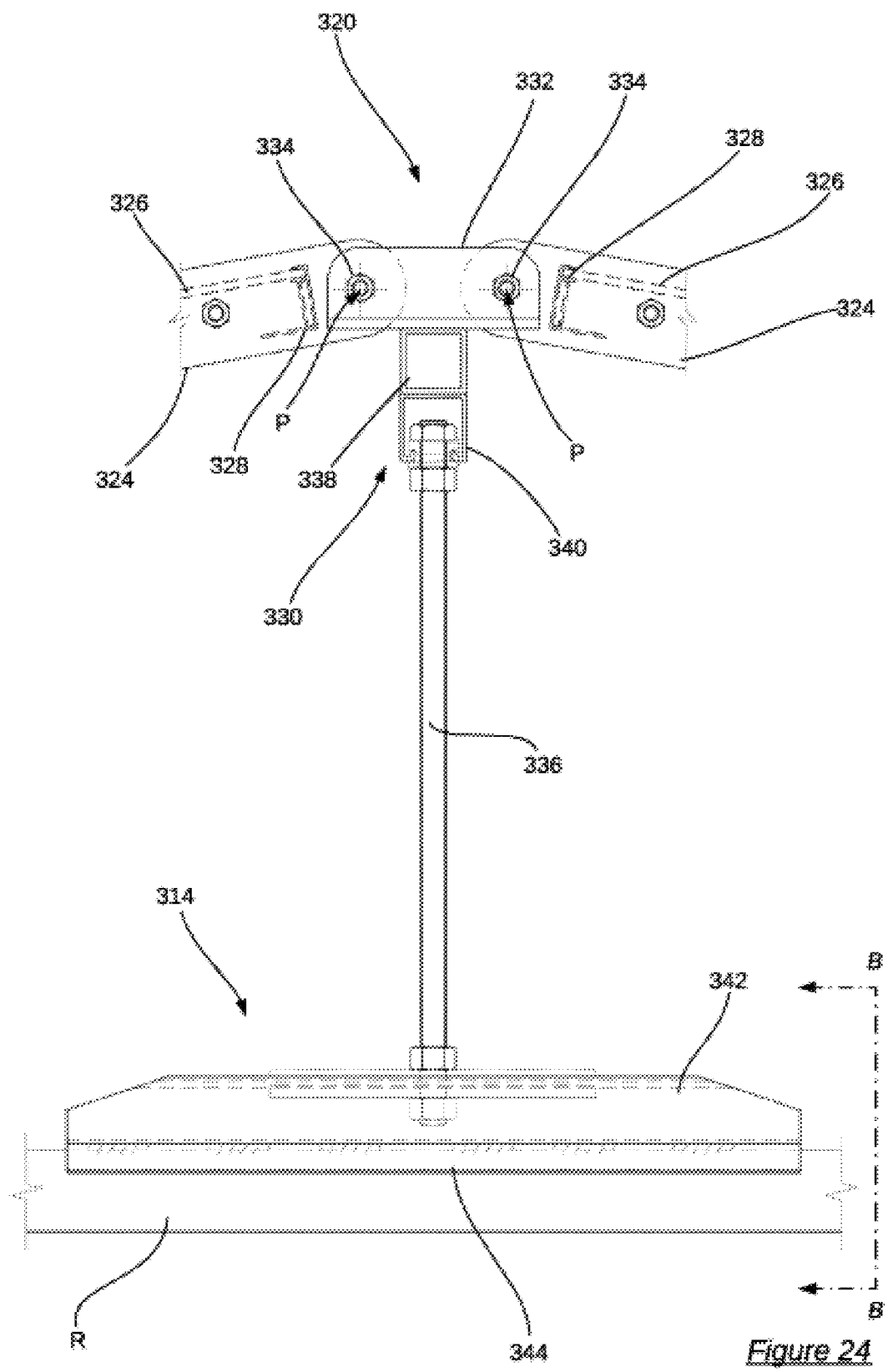
FIG. 24: is an enlarged view of Region A2 in FIG. 23.
Figure 29:
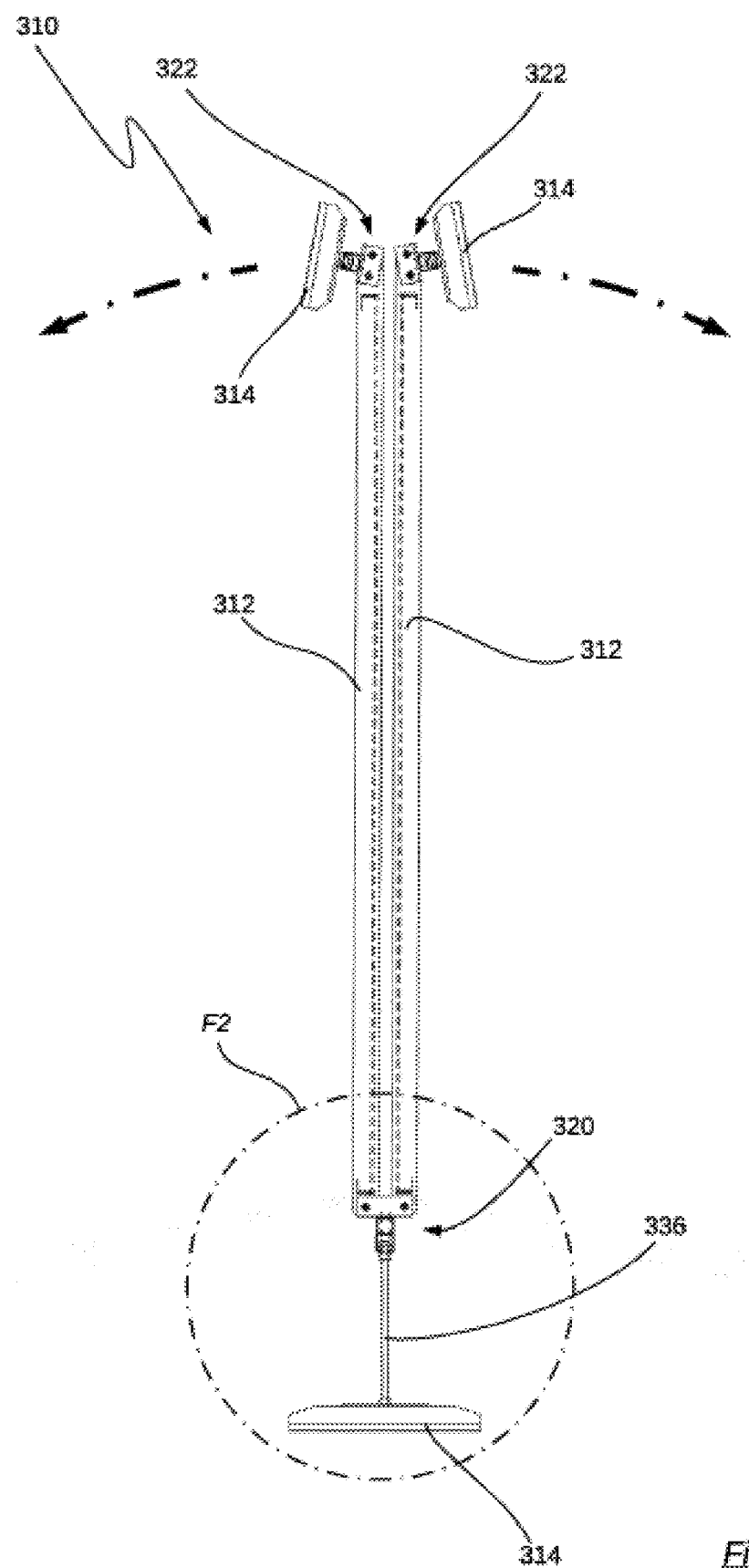
FIG. 29: is an end view of the photovoltaic assembly of FIG. 22, showing the assembly in a stowed configuration.
Figure 30:
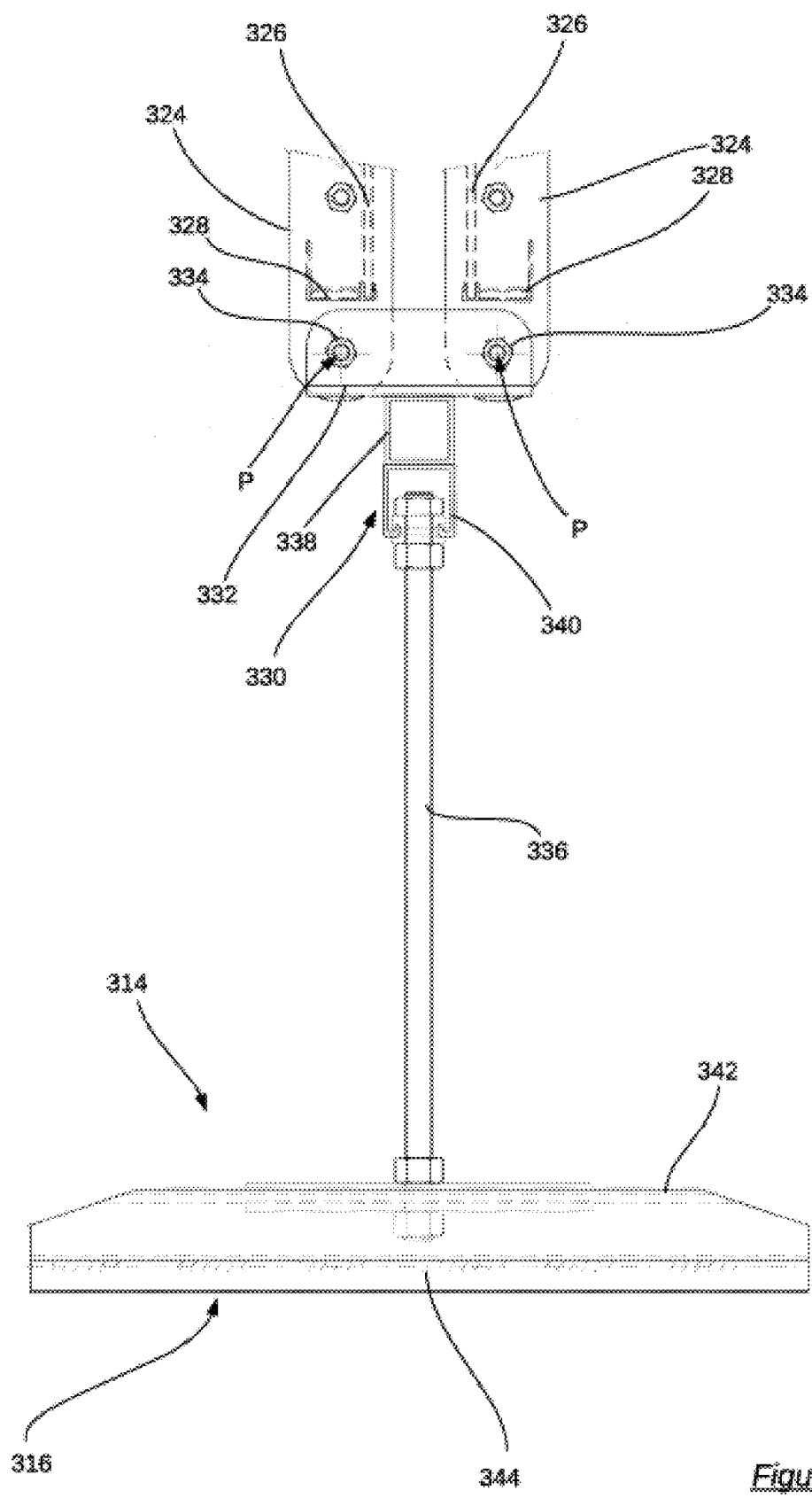
FIG. 30: is an enlarged view of Region F2 in FIG. 29.

The support structure of the assembly 10 also includes central legs 36, and a central beam 37. As shown in FIGS. 24 and 29, each central leg 36 has an upper end that is connected to the central member 30, and a lower end that is connected to one of the feet 14 in the first subset 14*a* of feet. In this example, each central leg 36 includes a length of threaded rod. In this particular embodiment, the central member 30 includes an upper hollow tube portion 38*a* (to which the transverse brackets 32 are connected), and a channel portion 40*a*. The upper end of each central leg 36 is secured in the channel portion 40*a* of the central member 30 by a flange nut that is slidable along the channel portion 40*a*. The width of the opening in the channel portion 40*a* corresponds with the width of the nut across its flats. A lock nut outside the channel portion 40*a* tightens against the central member 30 to secure the central leg 36 in position.

Similarly, the central beam 37 includes a lower hollow tube portion 38*b*, and a channel portion 40*b*. The lower end of each central leg 36 is secured in the channel portion 40*b* of the central beam 37 by a flange nut that is slidable along the channel portion 40b. The width of the opening in the channel portion 40a corresponds with the width of the nut across its flats. A lock nut outside the channel portion 40b tightens against the central beam 37 to secure the central leg 36 in position.

Each foot 14 is connected to the respective central beam 37/outer beam 22 by a joiner 39. The joiners 39 are described in further detail below, with reference to FIGS. 15 to 19. To facilitate the connection of the joiners 39 to the central beam 37, the lower hollow tube portion 38a has a trapezoidal outer profile. Similarly, to facilitate the connection of the joiners 39 to the outer beams 22, the lower hollow tube portion 38b has the same trapezoidal outer profile.

The manner in which the joiners 39 interconnect the feet 14 to the central beam 37 and outer beams 22 allow for adjustment of the relative positions of the feet 14 and beams 37, 22, as is further described below.

The height of the central legs 36 is selected to adopt a low-pitch A-frame shape to the assembly 10, when in its deployed configuration. As shown in FIG. 6, in this embodiment the pitch of the assembly 10 (indicated by the reference sign α) is approximately 10°. This low pitch has the advantage of the modules 12 being able to receive solar energy over a large range of sun angles, for a large number of installation orientations. Further, when the assembly 10 is installed on a low pitched roof (for example, a roof with a pitch of the order of 2° to 4°) the pitch α of the assembly 10 is capable of allowing water to run off the modules 12.

FIGS. 15 to 19 show a system 180 for mounting a service component to a building structure according to an embodiment of the present invention. As will be apparent from FIGS. 1 to 20, the support structure of the solar photovoltaic assembly 10 of FIGS. 1 to 14 utilizes a mounting system 180 to mount the assembly 10 to a roof structure.

Figure 15:
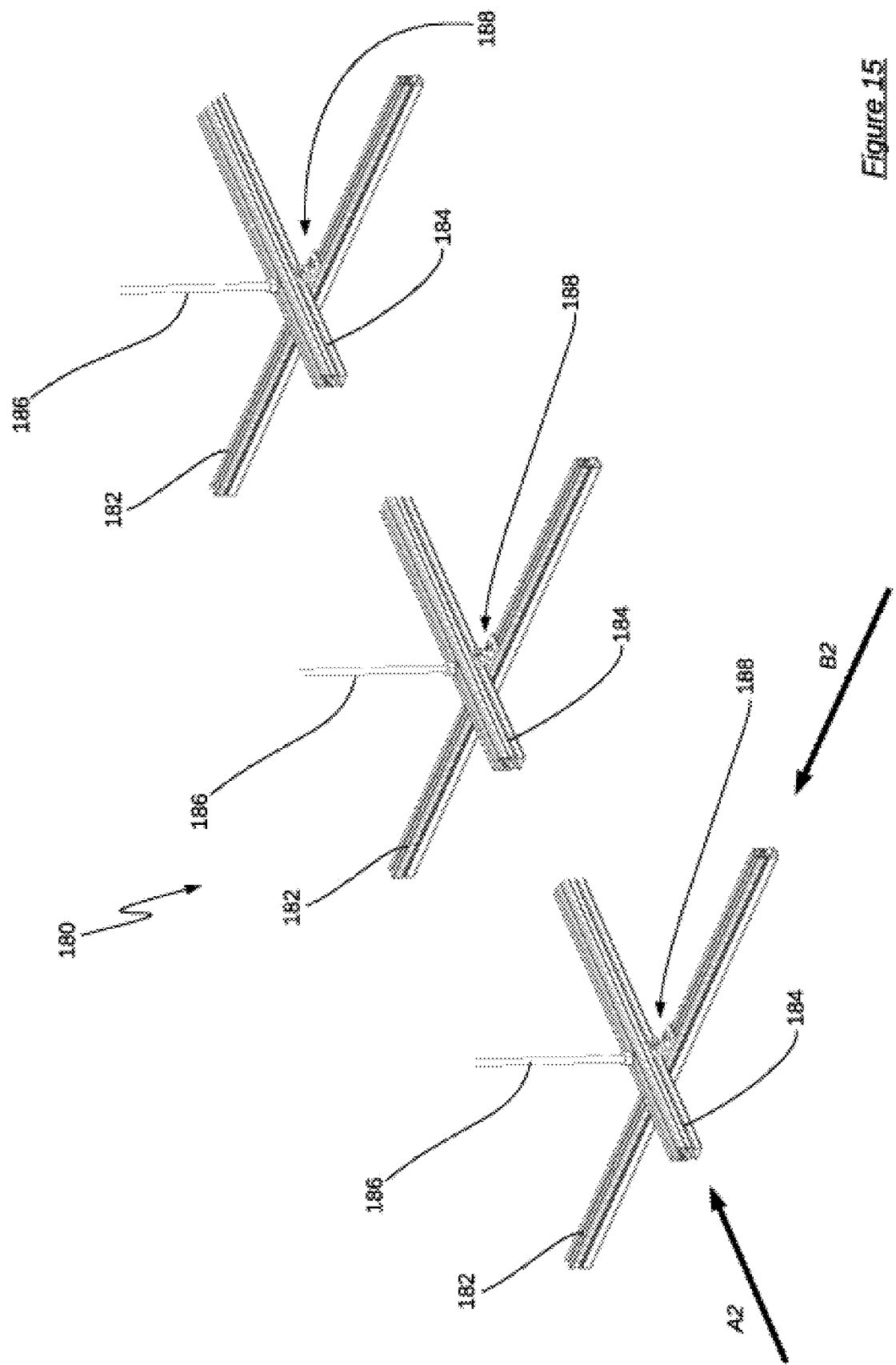
FIG. 15: is a perspective view of a system for mounting a service component to a building structure, the system being in accordance with a second embodiment of the present invention.

The system 180 has a plurality of elongate feet 182, each of which is configured to affix to a surface of the building structure and then to resist disengagement from that surface. An elongate beam 184 is connectable to the service component; in the embodiment of FIGS. 15 to 19, the connection to the service component is indicated by legs 186 (which corresponds with the central legs 36 of the assembly 10). As shown in FIG. 15, in the installed system 180, the beam 184 is to be positioned to extend obliquely across the feet 182.

Figure 16:
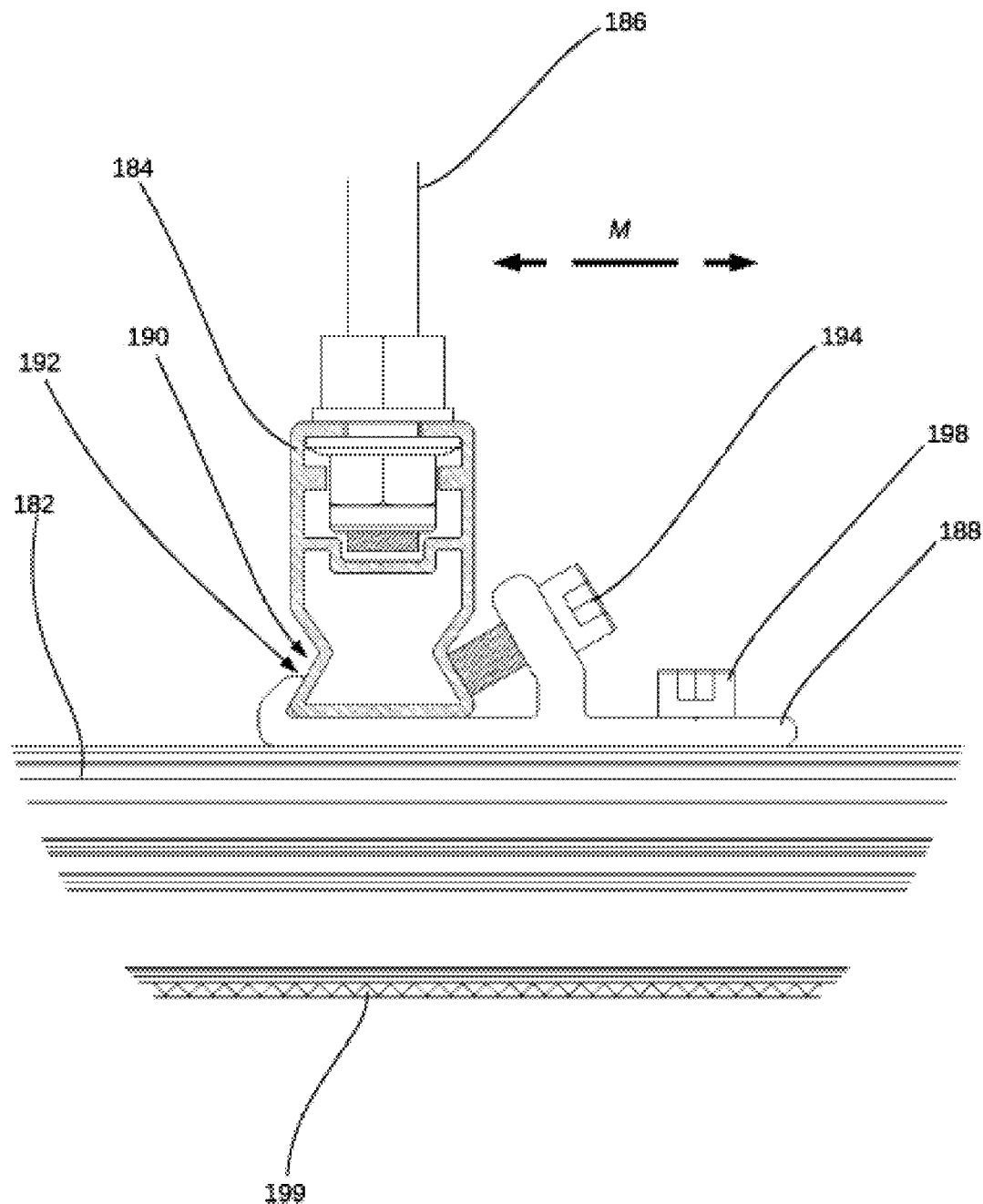
FIG. 16: is a first partial elevation view of the system, as viewed in the direction indicated by arrow A2 in of FIG. 15.
Figure 19:
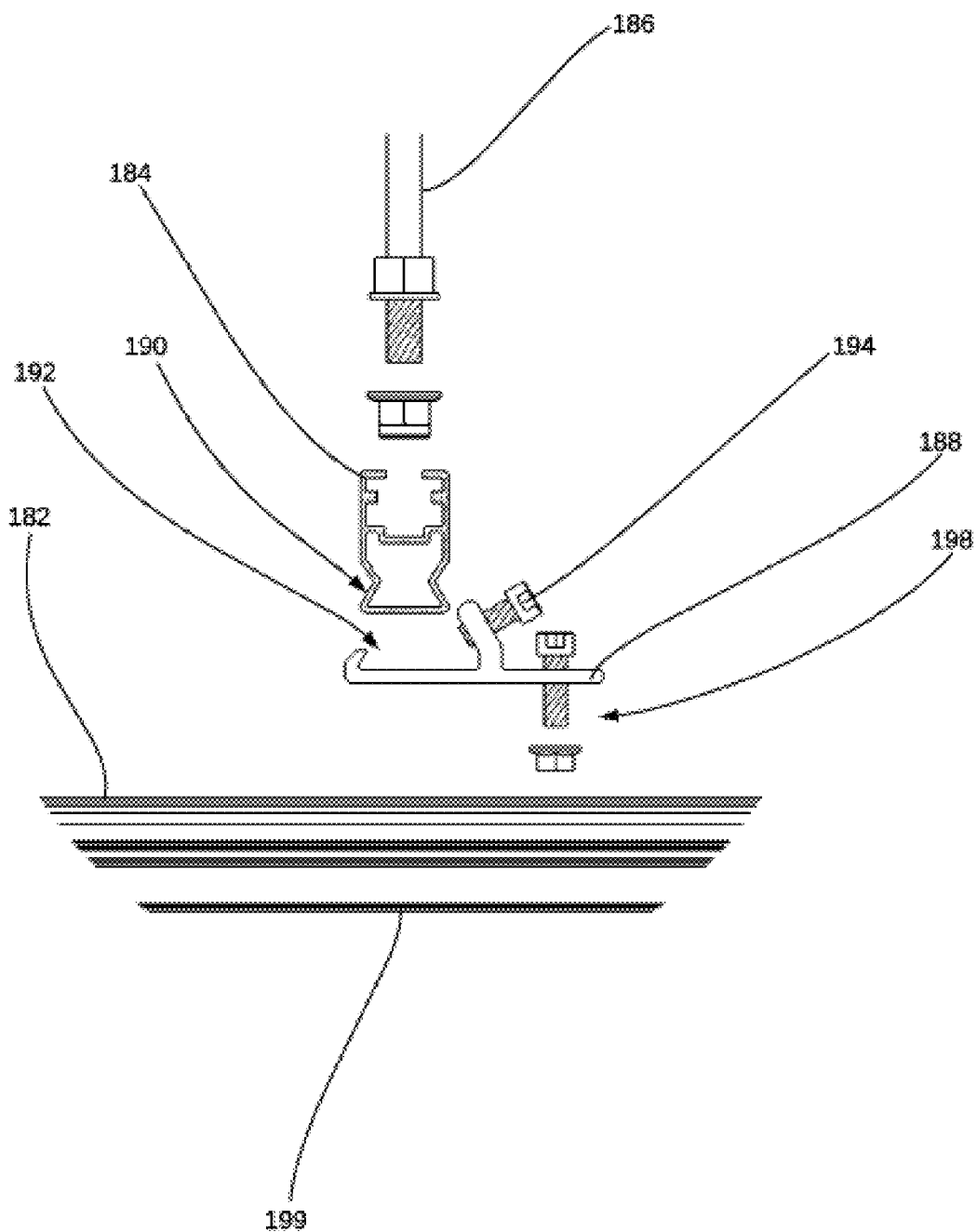
FIG. 19: is an exploded elevation view of the system of FIG. 15.
Figure 20:
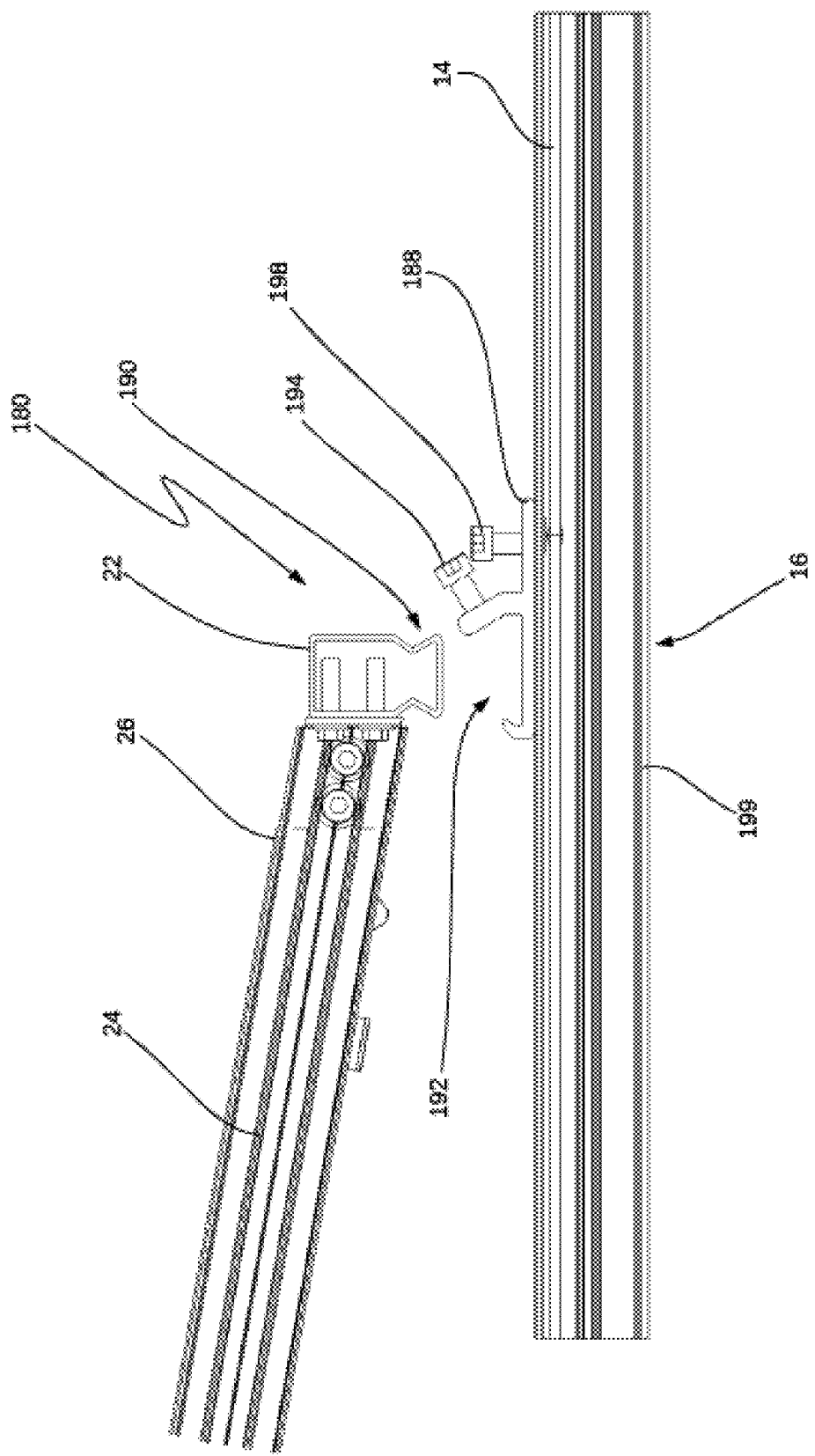
FIG. 20: is an enlarged view of the photovoltaic assembly as illustrated in FIG. 10 in a disassembled configuration.

Joiners 188 interconnect each foot 182 with the beam 184, and secure the relative position of the respective foot 182 and the beam 184. To this end, the beam 184 includes a portion with a trapezoidal profile 190, as shown in FIGS. 16 and 19. Each joiner 188 has a clamping portion 192 that releasably clamps onto the trapezoidal portion 190 of the beam 184. The clamping portion 192 has a pair of opposing jaws between which the trapezoidal portion 190 is locatable. A binding bolt 194 extends through the an internally threaded hole (not shown) in one of the jaws. With the trapezoidal portion 190 located between the jaws, the binding bolt 194 is tightened to bind the beam 184 within the clamping portion 192.

Figure 17:
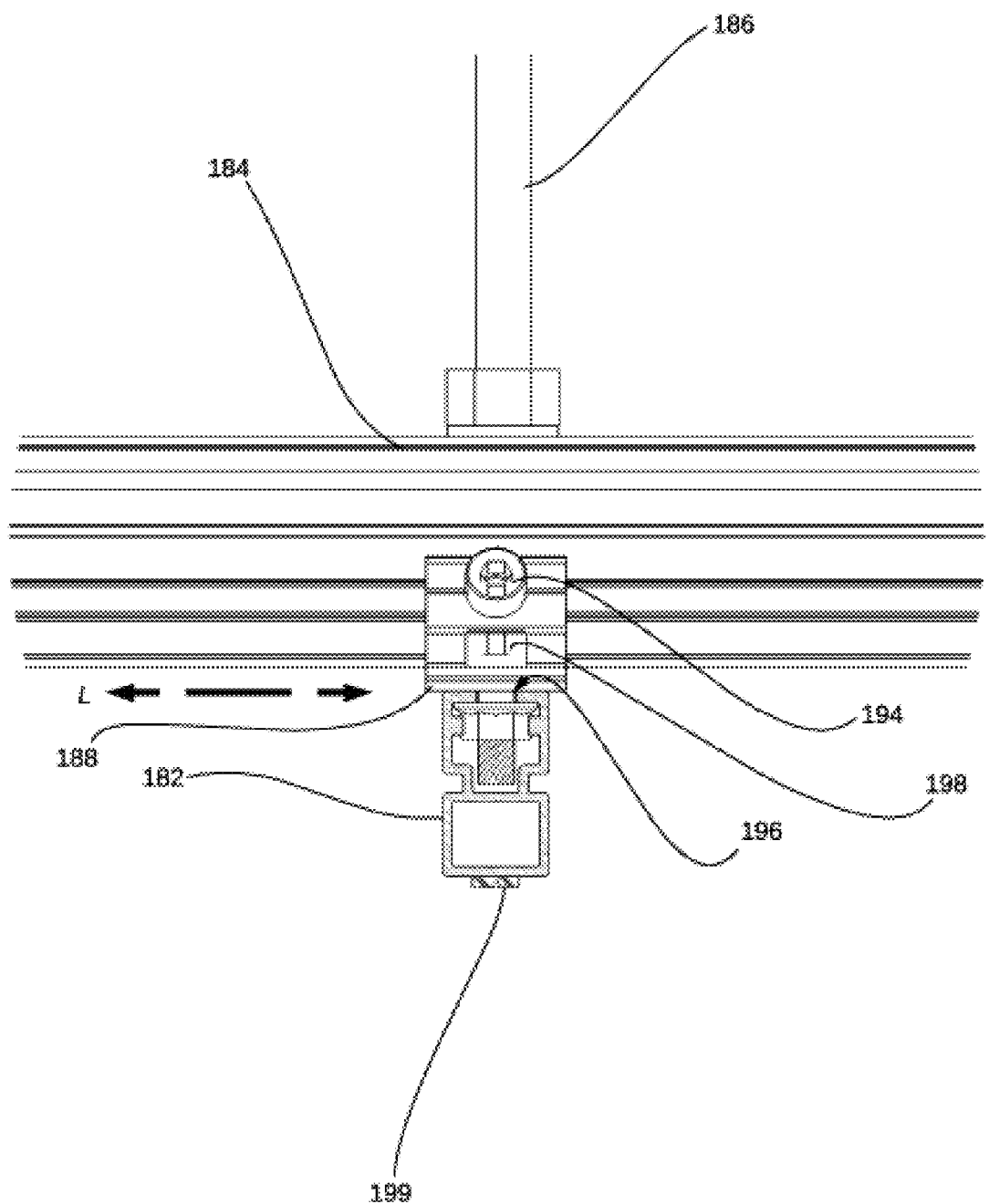
FIG. 17: is a first partial elevation view of the system, as viewed in the direction indicated by arrow B2 in of FIG. 15.
Figure 18:
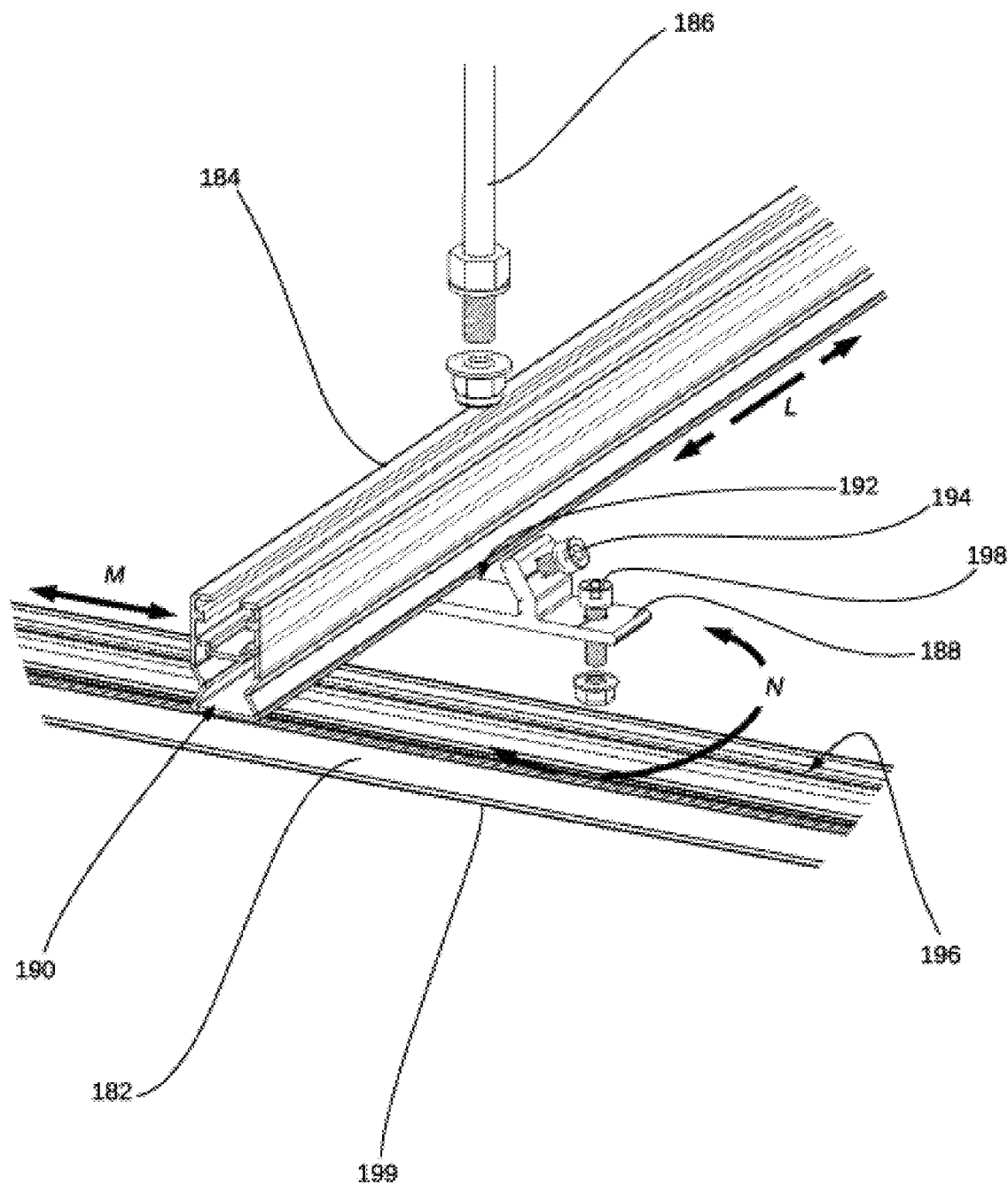
FIG. 18: is an exploded perspective view of the system of FIG. 15.

The constant cross-sectional shape of the trapezoidal portion along the length of the beam 184 enables the position of the joiner 188 with respect to the beam 184 to be adjustable in a direction parallel to the elongate direction of the beam 184 (as indicated by the double-headed arrow L in FIGS. 17 and 18).

A securing fastener 198 connects each joiner 188 to the respective foot 182. As shown in FIG. 18, each foot 14 includes an upwardly oriented channel 196. A flange nut of the fastener 198 that is located within the channel 196. The width of the opening in the channel 196 corresponds with the width of the flange nut across its flats. A bolt of the fastener 198 extends through an aperture (not shown) in the joiner 188 to mate with the flange nut in the channel 196.

The flange nut of the securing fastener 198 is slidable along the length of the channel 196. In this way, the position of the joiner 188 with respect to the foot 182 to be adjustable in a direction parallel to the elongate direction of the foot 182 (as indicated by the double-headed arrow M in FIGS. 16 and 18).

When the securing fastener 198 is assembled on the foot 182 and joiner 188, and not fully tensioned, the clamping portion 192 is rotatable about the securing fastener 198 (as indicated by the double-headed arrow N in FIG. 18). The capacity to adjust the relative rotational position of the foot 182 and joiner 188 enables the system 180 to accommodate non-orthogonal positioning of the foot 182 and the beam 184.

The underside of each foot 182 has adhesive material 199 that is to affix to the surface of the building. In this particular example, the adhesive material 199 includes a piece of compressible foam on which adhesive is disposed. The use of the adhesive material enables the loads of the service component to be supported by the portion of the building structure, whilst avoiding the need to pierce the building structure with any part of the mounting system 180.

Figure 21:
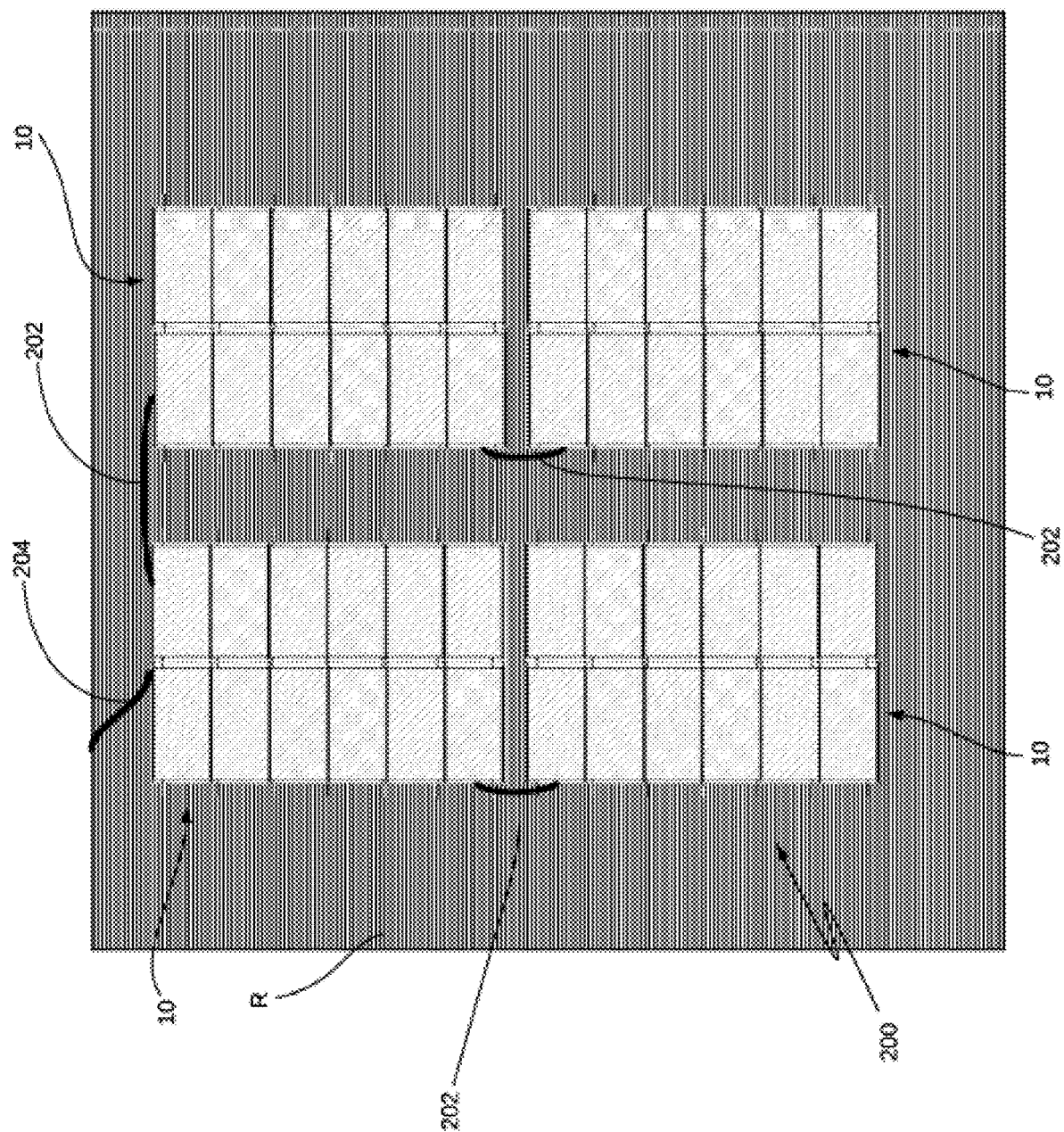
FIG. 21: is a schematic plan view of a solar photovoltaic system according to a third embodiment of the present invention in an exemplary layout.

FIG. 21 shows schematically a solar photovoltaic harvesting system 200 according to a third embodiment. The system 200 of this example includes four solar photovoltaic assemblies 10 of the type shown in FIGS. 1 to 14. Each assembly 10 is affixed to a roof R of a building. The system 200 includes an electrical system with electrical conduits 202 that interconnect the assemblies 10, and an electrical conduit 204 to distribute harvested electrical energy to another electrical system, such as the electrical circuits of the building, a storage battery, and/or an electricity grid.

FIGS. 22 to 30 show a solar photovoltaic assembly 310 according to a fourth embodiment of the invention. The solar photovoltaic assembly 310 is substantially similar to the system 10 shown in FIGS. 1 to 14, and accordingly component parts of the system 310 that are similar to those of system 10 have the same reference numeral with the prefix "3".

The assembly 310 differs from the system 10 in the construction of the central support portion 320 and in outer support portions 322 to which the spars 324 of the assembly 310 are connected.

Figure 25:
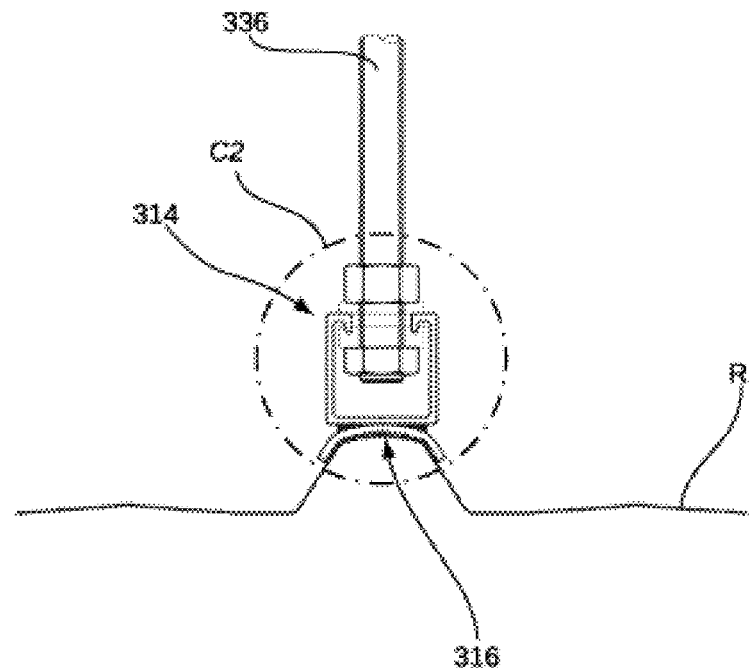
FIG. 25: is an enlarged view along line BB in FIG. 24.
Figure 26:
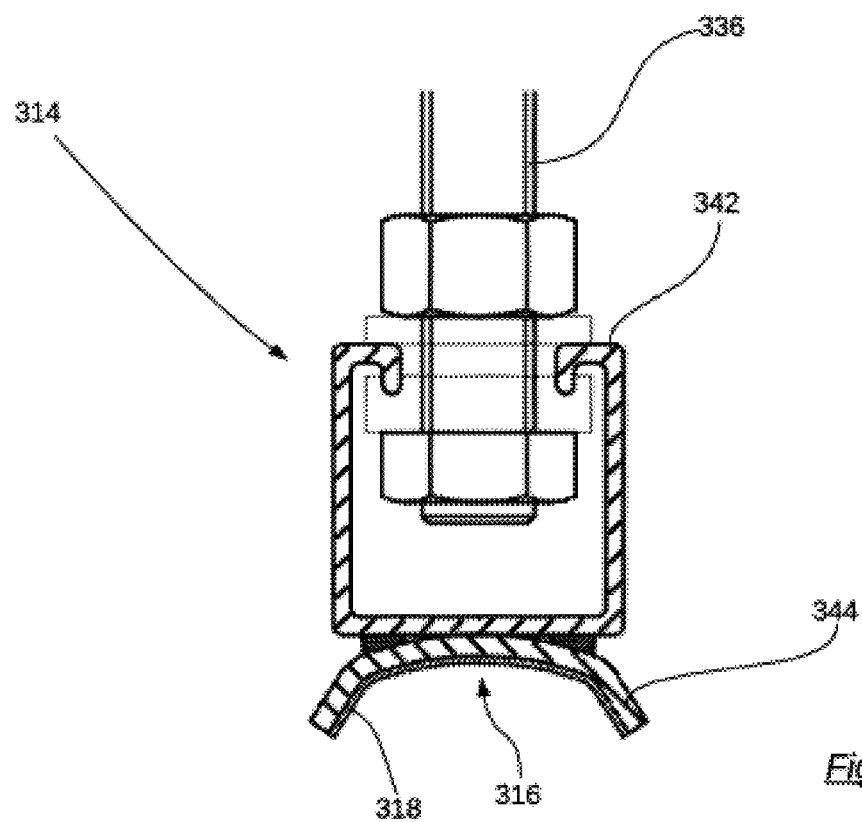
FIG. 26: is an enlarged view of Region C2 in FIG. 25.
Figure 27:
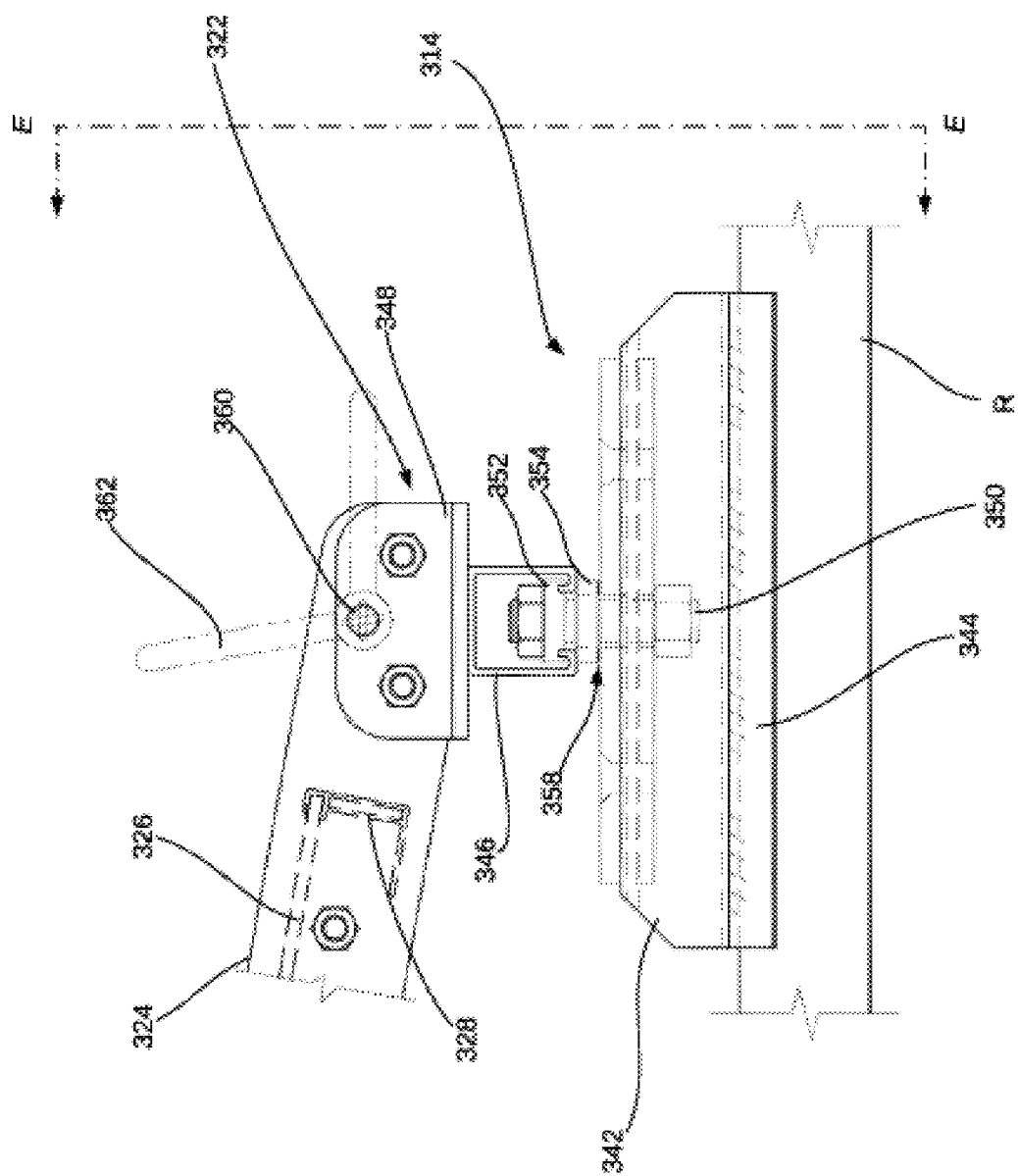
FIG. 27: is an enlarged view of Region D2 in FIG. 23.
Figure 28:
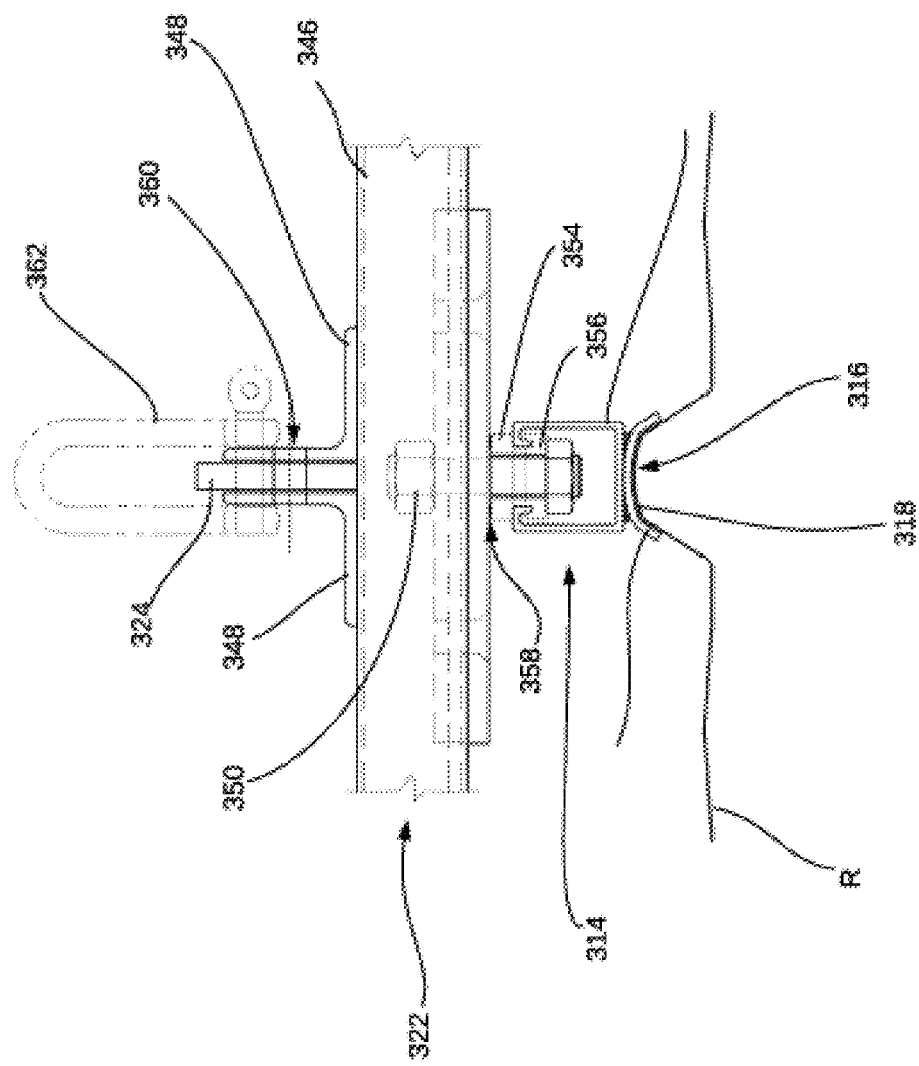
FIG. 28: is an enlarged view along line E-E in FIG. 27.

The feet 314 of the assembly 310 are concave to match a complementary convex portion of the roof R. To this end, the underside surface 316 of each foot 314 forms a generally elongate inverted channel shape. FIGS. 25 and 28 illustrate the embodiment with a Lysaght® Trimdeck roof profile that has trapezoidal ribs. The concavity of each foot 314 generally complements the shape of the trapezoidal ribs, so that the foot 314 sits on the top of each rib.

FIGS. 24 to 28 show the feet 314 in detail. As particularly shown in these Figures, each foot 314 includes a channel portion 342 that is joined to a foot plate tube portion 344. The foam 318 with the adhesive material is adhered to the underside surface of the foot plate tube portion 344. The foot plate 344 is formed with a concavity that matches the profile of the ribs in the roof R.

Each of the two outer support portions 322 includes an elongate channel portion 346, and clevis brackets 348. Each clevis bracket 348 is connected to the channel portion 346, and receives an outer end of one of the spars 324. The support structure includes outer connectors 350 that each interconnect one of the outer support portions 322 with one of the feet 314 in the outer subsets 314b of feet.

In this example, each outer connectors 350 includes a length of threaded rod, a pair of nuts and a set of washers. The threaded rod extends between the channel portion 346 of the outer support portion 322, and the channel portion 342 of the foot 314. An upper washer 352 is positioned internally of the channel portion 346, an intermediate washer 354 is positioned between the outer support portion 322 and the foot 314, and a lower washer 356 is positioned internally of the channel portion 342. Further, a washer 358 formed of low friction material is positioned between the intermediate washer 354 and the foot 314. For example, washer 358 may be made of polytetrafluoroethylene (PTFE). Washer 358 allows for relative movement of the foot 314 with respect to the outer support portion 322. In particular, the connection between each outer connector 350 and the respective foot 314 allows for relative movement between the outer connector 350 and foot 314 in a plane that is generally parallel to the outer support portion 322.

In the assembly 310, each of the feet 314 is rotatable relative to the modules 312 to align the underside surfaces 316 with a complementary shaped portion of the roof R to which that foot is to be affixed. Further, each of the central legs 336 is detachably connected to the central support portion 320. Similarly, each of the outer connectors 350 is detachably connected to the respective outer support portion 322.

In this embodiment, the sum of the lengths of all feet 314 within the first subset 314a of feet is approximately 97.5% of the length of the assembly 310 in the direction parallel to the centre support portion 320. The sum of the lengths of all feet within each second subset of feet is approximately 54% of the length of the assembly in the direction parallel to the respective outer support portion 322.

In one illustrative and non-limiting example, the assembly 310 is 6 metres in length (parallel to the central support portion 320); each foot in the first subset 314a of feet is 450 mm in its longest dimension, and each foot in the second subsets 314b of feet is 250 mm in its longest dimension.

The support structure includes a plurality of lifting points for connection to lifting equipment during installation of the assembly. In this particular embodiment, the lifting points are in the form of a through holes 360 that extend through both the clevis brackets 348 and spars 324. Shackles 362 can be connected to the assembly 310 via the through holes 360. As is evident from FIG. 29, the lifting points are positioned so that when the assembly 310 is in the stowed configuration, the centre of gravity of the assembly 310 is below the lifting points.

The support structure is configured so that, when the sets of modules 312 are in the deployed configuration and the assembly 310 is affixed to a generally flat structure, the assembly 310 adopts a general A-frame arrangement. In this particular embodiment, the support structure spaces the modules 310 outwardly from the external surface of the building. The heights of the central legs 336 and outer connectors 350 and the length of each set of modules 310 is such that the internal angle of the A-frame arrangement is approximately 10°.

Figure 31:
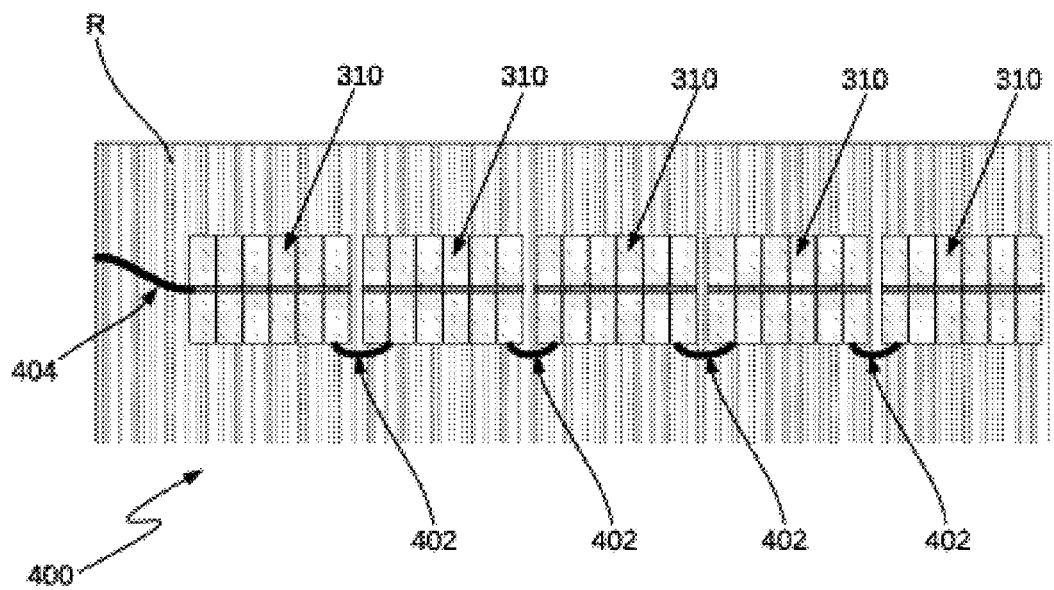
FIG. 31: is a schematic plan view of a solar photovoltaic system according to a fifth embodiment of the present invention in a first exemplary layout.
Figure 32:
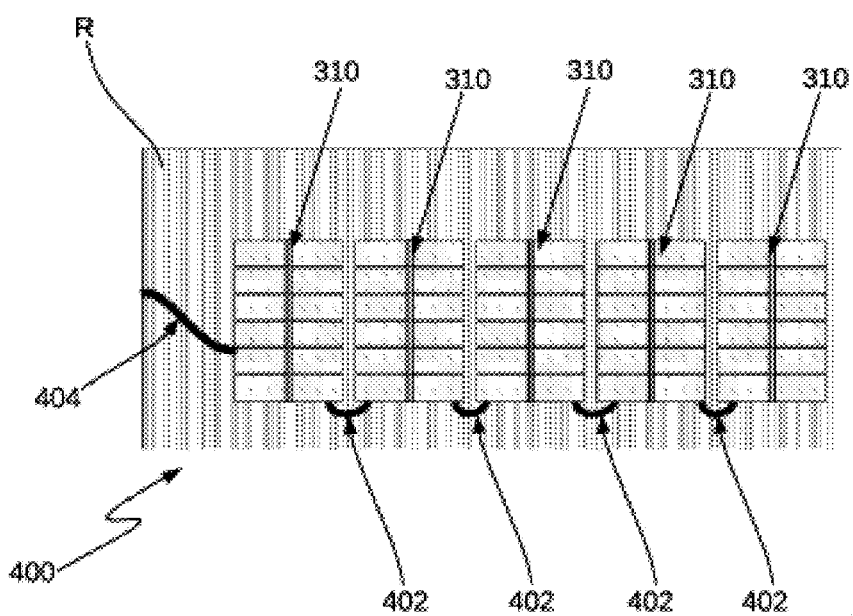
FIG. 32: is a schematic plan view of the photovoltaic system of FIG. 31 in a second exemplary layout.

FIGS. 31 and 32 each show a solar photovoltaic harvesting system 400 according to a fifth embodiment. The system 400 of this example includes five solar photovoltaic assemblies 310 of the type shown in FIGS. 22 to 30. Each assembly 310 is affixed to a roof R of a building. The system 400 includes an electrical system with electrical conduits 402 that interconnect the assemblies 310, and an electrical conduit 404 to distribute harvested electrical energy to another electrical system, such as the electrical circuits of the building, a storage battery, and/or an electricity grid.

In the example of FIG. 31, the assemblies 310 are in a layout in which the central support portions 320 are generally collinear. In addition, ribs of the roof material are perpendicular to the central support portions 320. Accordingly, in this example the feet 314 extend generally transversely to the central support portions 320.

In the example of FIG. 32, the assemblies 310 are in a layout in which the central support portions 320 are generally parallel, but are not collinear. In addition, ribs of the roof material are parallel to the central support portions 320. In each assembly 310, the feet 314 are rotatable relative to the modules 312 to align the underside surface with a complementary shaped portion of the external surface of the building to which that foot is to be affixed. Accordingly, in the example of FIG. 32, the feet 314 are rotated from the position illustrated in FIGS. 23 and 24, so as to extend in a generally parallel direction with respect to the central support portions 320.

FIGS. 33 to 36 illustrate stages in a method of installing a solar photovoltaic assembly 310 on the external surface of a building. In this example, the solar photovoltaic assembly 110 is substantially similar to that of FIGS. 22 to 30. However, for clarity, certain component parts of the assembly 310 are not shown in FIGS. 33 to 35. The external surface of a building in this example is a roof R. The assembly 310 is particularly suitable for mounting on a roof R of a building. The method is particularly useful in installations of the assembly 310 on a roof R. Further, the assembly 310 is particularly suitable for mounting on a roof R that has a pitch that is less than 45°, and preferably less than 25°.

Figure 33:
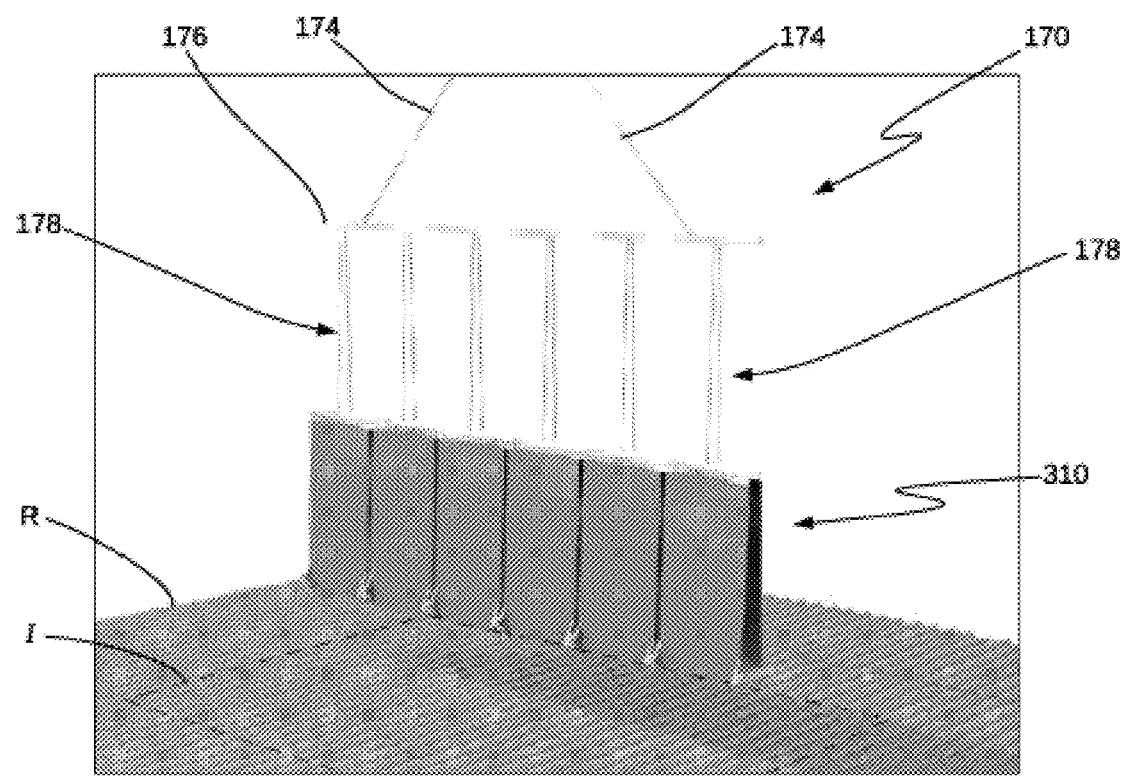
FIGS. 33 to 36: each schematically illustrate a stage in a method of installing the roof mountable solar photovoltaic assembly, the method being in accordance with a sixth embodiment of the present invention.
Figure 34:
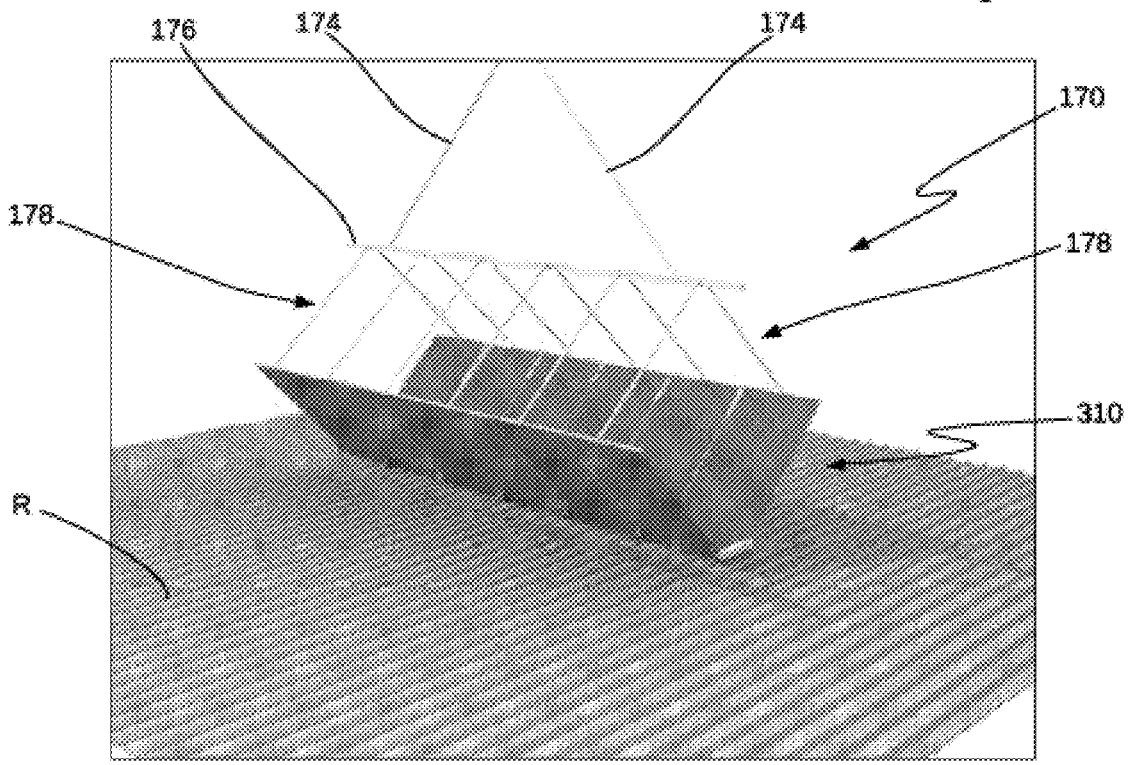
Figure 35:
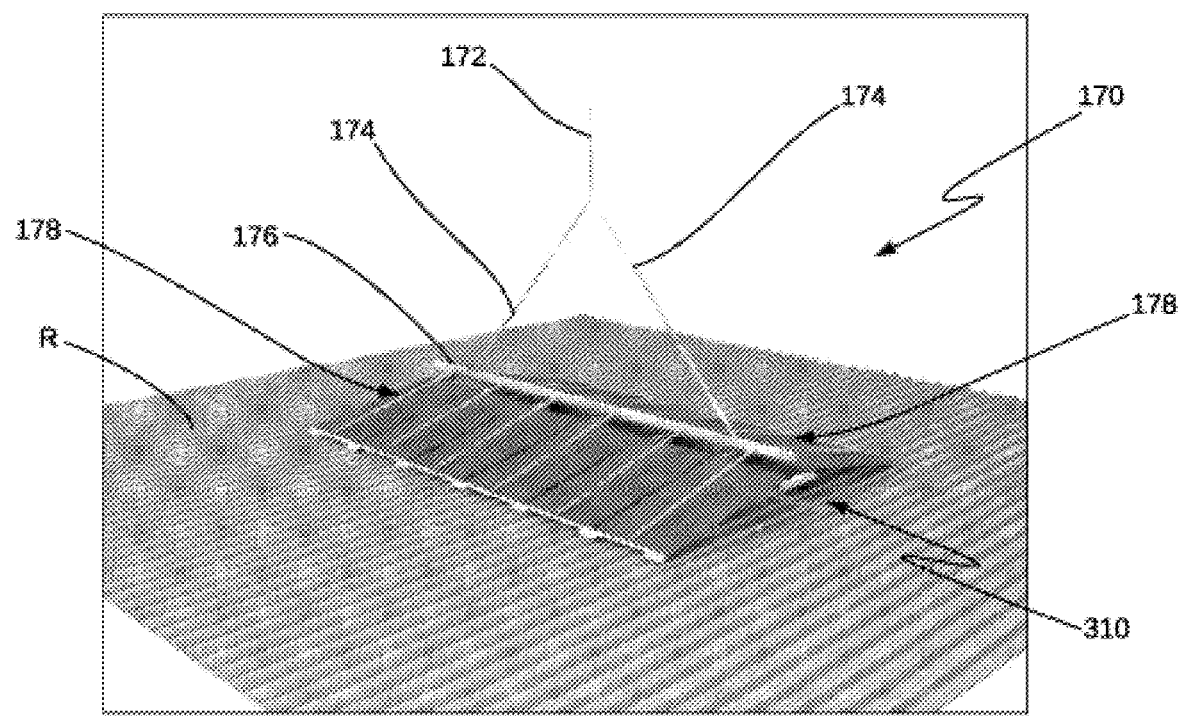

The method involves the following steps:
step 1: with the assembly 310 in the stowed configuration, bringing the assembly 310 towards its intended installation position—as illustrated in FIG. 33;
step 2: placing the first subset of feet in contact with the roof R;
step 3: affixing the first subset of feet to the external surface of the building;
step 4: moving the sets of modules into the deployed configuration—illustrated in FIG. 34; and
step 5: affixing the or each second subset of feet to the roof R—illustrated in FIG. 35.

Figure 36:
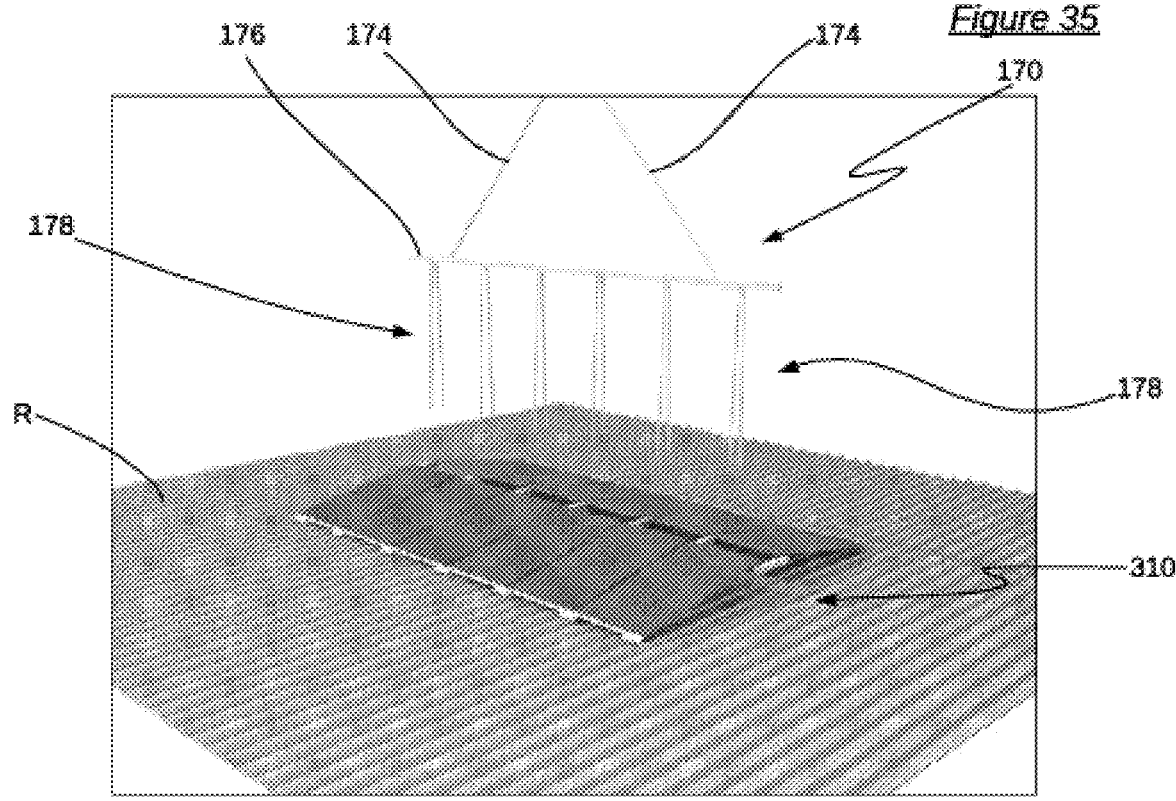

In FIG. 33, the intended installation position on the roof R is indicated by broken lines I. On completion of the method, the assembly 310 is affixed to the building with the sets of modules 312 in the deployed configuration, as shown in FIG. 36.

The support structure of the assembly 310 includes lifting points. The method can further involve connecting lifting equipment 170 to the lifting points. In FIGS. 33 to 35, the lifting equipment 170 includes a lifting sling 172, traces 174, and a crossbar 176. The traces 174 and crossbar 176 are interconnected so that a triangle is formed when the traces 174 are connected to, and suspended from the sling 172. The lifting equipment also includes a set of straps 178 that hang from the crossbar 176. The lower, free end of the straps 178 are connectable to the lifting points on the assembly 110. In this embodiment, the straps 178 are in two sets, with each set of straps 178 being connectable to the lifting points associated with a respective set of modules 112. As will be appreciated, the lifting sling 172 can be lifted by a crane, or the like.

Step 1 involves suspending the assembly 310 above the ground, and also the roof R, from the lifting points, via the lifting equipment 170 and crane. In transitioning from step 1 to step 2, the lifting equipment 170 and assembly 310 are lowered by the crane. The particular position of the feet 314 in the first subset 314a can be set, with respect to both the position of those 314 feet on the roof R and the rotational alignment of the feet 314 to features on the roof R.

When the entire assembly 310 is suspended from the lifting equipment 170, as shown in FIG. 33, the assembly 310 is held in the stowed configuration. However, when the first subset of feet 314 is affixed to the surface of the roof R, the central support portion of the assembly 310 is at least partly supported by the roof R. To this end, it will be understood that in certain embodiments of the assembly, steps 2 and 3 of the method may occur substantially simultaneously.

Following step 3, further lowering of the lifting equipment 370 allows the sets of modules 310 to pivot on their respective pivot axes out of the stowed configuration and towards the deployed configuration. As indicated by FIG. 34, step 4 involves lowering the lifting points relative to the central support portion of the assembly 310. It will be appreciated that this step may require manual intervention at least initially to ensure that each set of modules 310 pivots in the direction required.

During installation of the assembly 310, the proportion of the weight of the assembly 310 that is supported by the roof R through the centre support portion 320 and first subset 314a of feet varies, as the two sets of modules 10 are moved into the deployed configuration. The proportion of the weight of the assembly 10 that is carried by the lifting equipment 170 also varies.

In the embodiment of FIGS. 22 to 30, each foot 314 has adhesive material that is to affix to the roof R. To prevent contaminants (such as dirt, dust, and oil) from contacting the adhesive material prior to installation of the assembly 10 onto the roof R, a release liner may be provided across the adhesive material at the underside surface 316. In this case, the method involves removing the release liners from the adhesive material prior to step 3.

It may also be desirable to prepare the roof R prior to affixing the feet 314, and thus the method can further involve cleaning the external surface of the building at the installation site to remove dirt and/or other contaminating material.

Following step 5 above, the lifting equipment 170 can be detached from the assembly 110 and taken away, as shown in FIG. 36.

A method of installing the solar photovoltaic assembly 10 (illustrated in FIGS. 1 to 14) on a surface of a building involves the following steps:
- step 1: locating the feet 14 at the intended installation position on the surface of the building;
- step 2: affixing the feet 14 to the surface;
- step 3: with the assembly 10 in the stowed configuration, bringing the assembly 10 towards the feet 14;
- step 4: connecting the central beam 37 of the support structure to the first subset of feet 14a;
- step 5: moving the sets of modules 12 into the deployed configuration; and
- step 6: connecting the outer beams 22 of the support structure to the second subsets of feet 14b.

The method can further involve preparing the surface of the building at the installation site to maximize the adhesion between the surface and each foot 14, prior to affixing the respective foot 14 to the surface of the building. Preparing the surface can involve:

- cleaning the surface to remove dirt and/or other contaminating material;
- abrading the surface to introduce surface imperfections; and/or
- applying a primer to the surface.

In one implementation of the method, the compressible foam 18, with adhesive on both sides of the foam is affixed first to the surface of the building, and then the underside 16 of each foot 14 is affixed to the compressible foam 18. Pressure can be applied to the foam 18 to increase the adhesion of the foam 18 to the surface.

In some alternative implementations of the method, the compressible foam 18 is affixed to the underside 16 of each foot 14 prior to affixing the feet 14 to the surface. In these alternative implementations, steps 1 and 2 occur simultaneously. Step 2 can further involve applying pressure to the feet to maximize the adhesion between the surface and each foot 14.

In embodiments in which the assembly 10 in the stowed configuration has the upper ends of the central legs 36 connected to the central beam 37, step 4 above can further involve connecting the lower ends of the central legs 36 to the feet 14 in the first subset 14a of feet.

Throughout this specification and the claims which follow, unless the context requires otherwise, method steps do not imply a sequence or order by which the method steps are implemented, except where the context requires a sequence or order, either in part, or in the entirety of the method.

Figure 1:
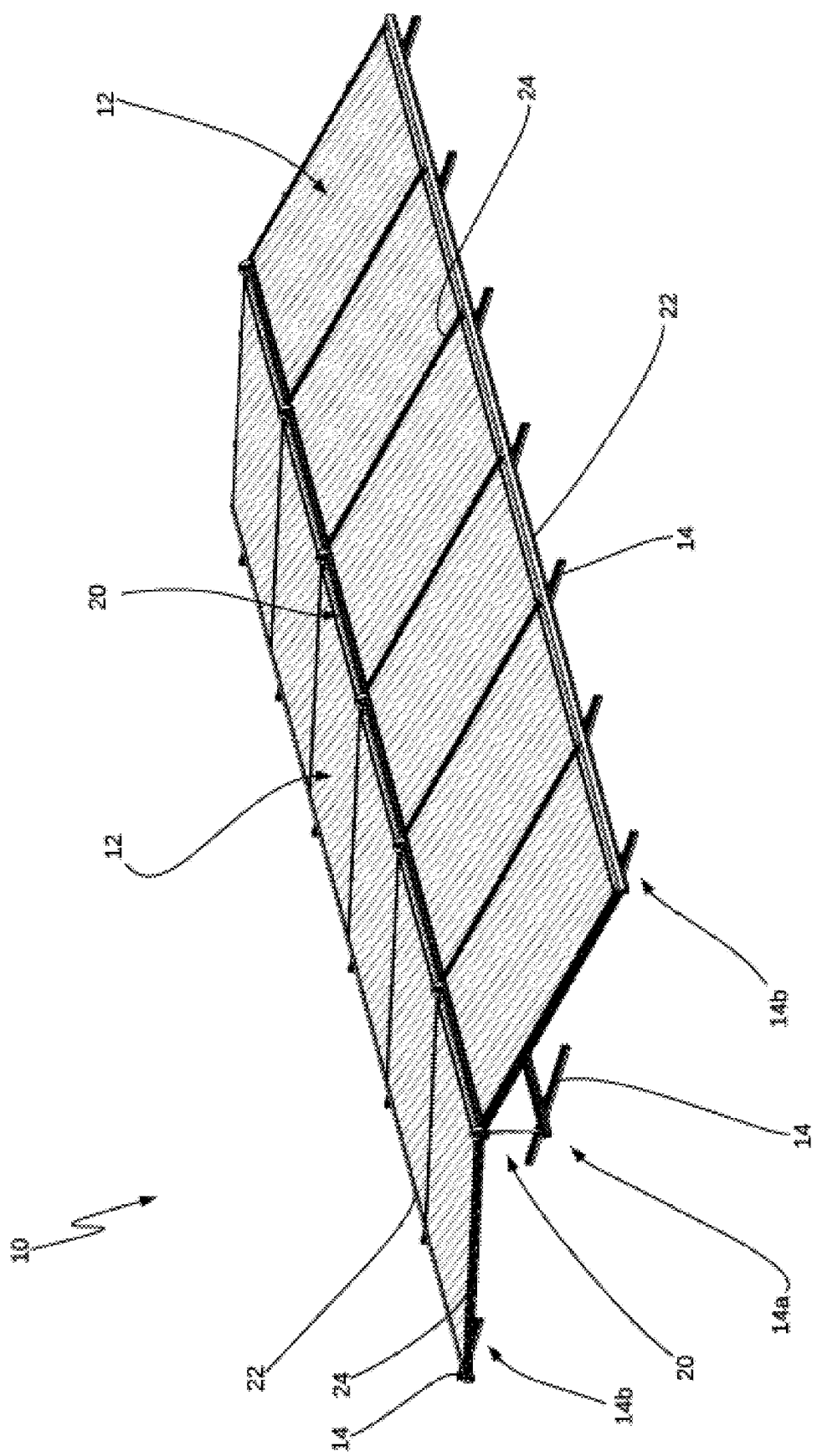
FIG. 1: is a perspective view of a roof mountable solar photovoltaic assembly according to a first embodiment of the present invention, showing the assembly in a deployed configuration.
Figure 2:
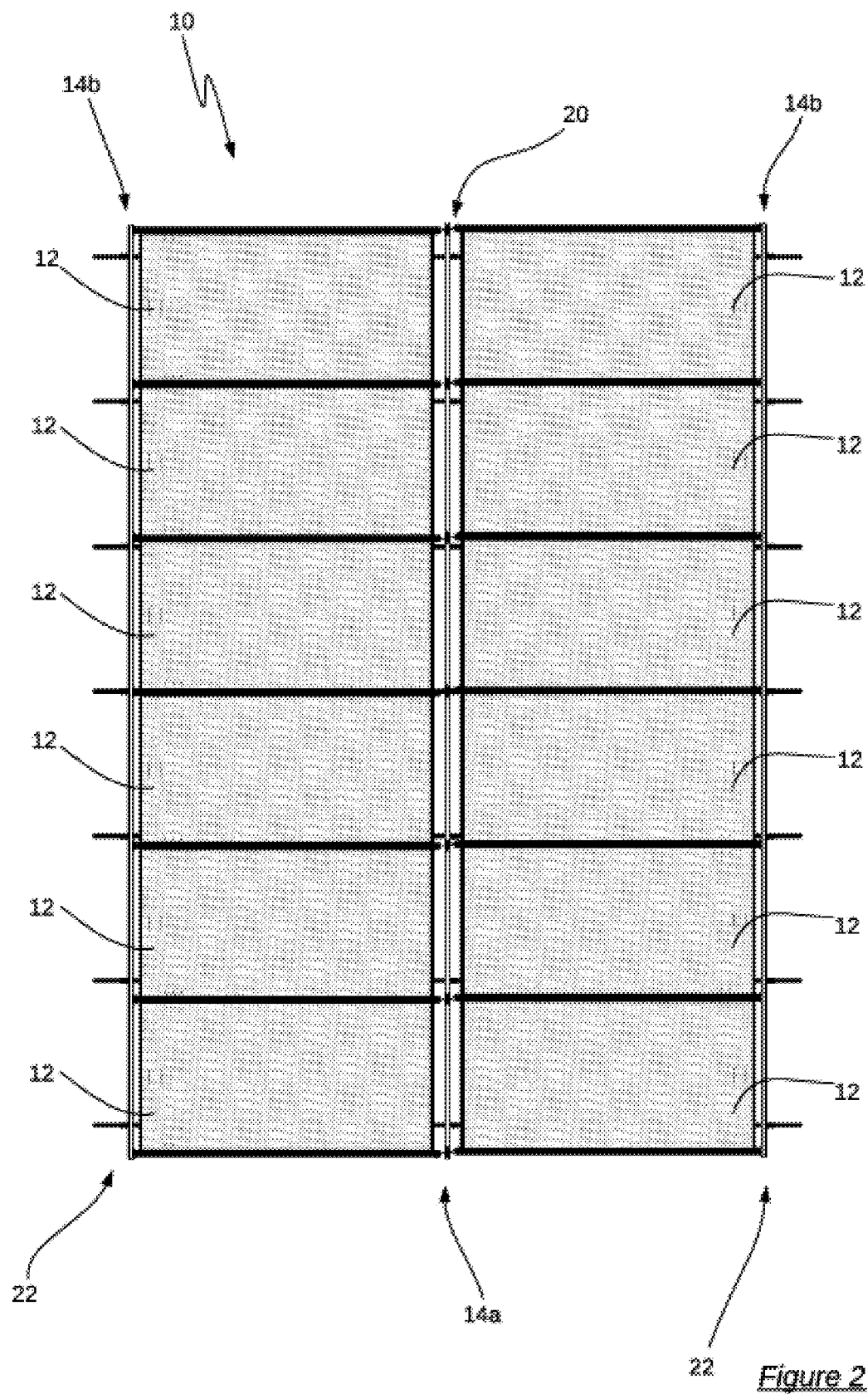
FIG. 2: is a plan view of the photovoltaic assembly of FIG. 1.
Figure 37:
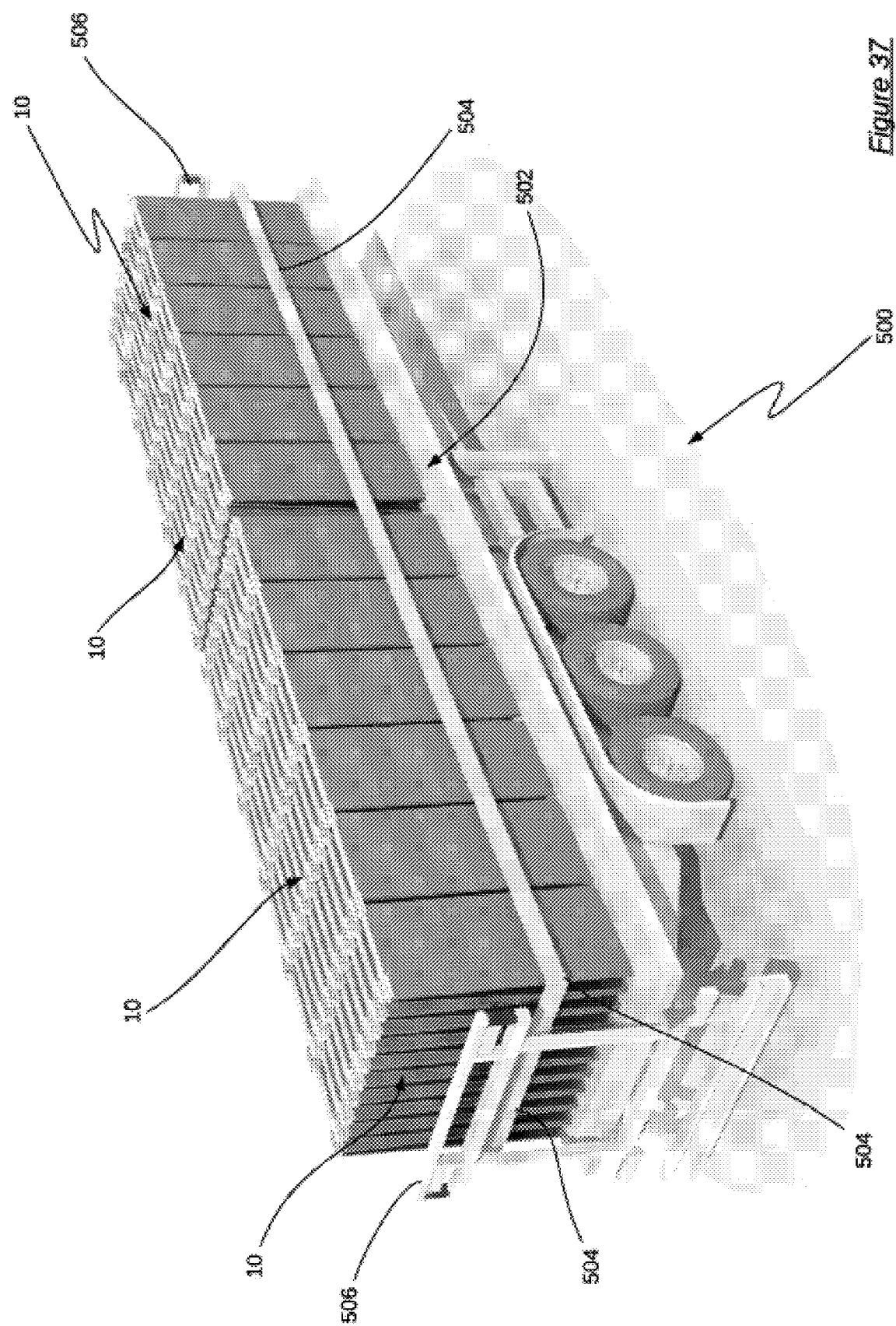
FIG. 37: is a rear perspective view of a transport assembly for transporting solar photovoltaic assemblies, the transport assembly being in accordance with a seventh embodiment of the present invention.
Figure 38:
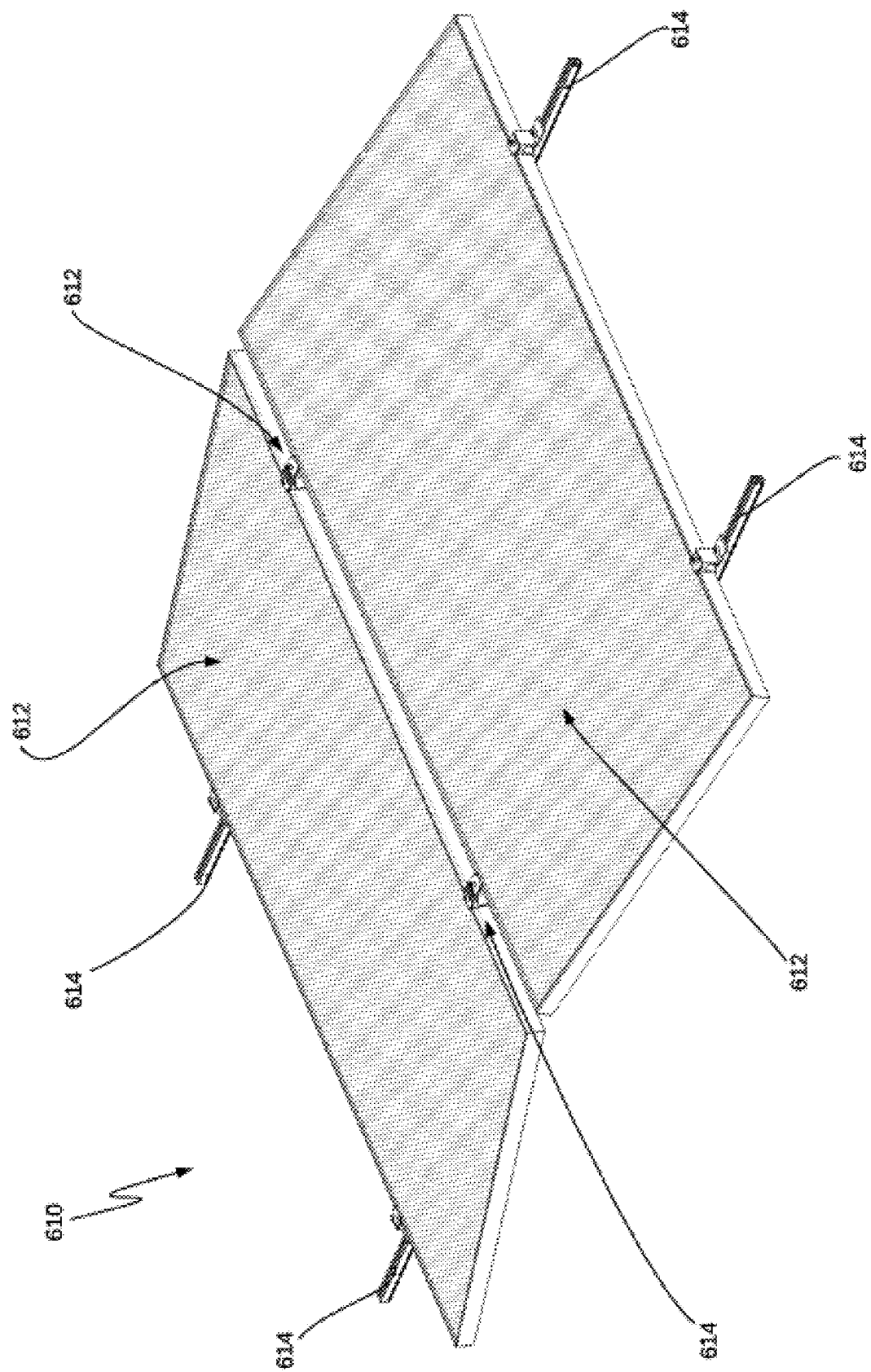
FIG. 38: is a perspective view of a roof mountable solar photovoltaic assembly according to an eighth embodiment of the present invention.
Figure 39:
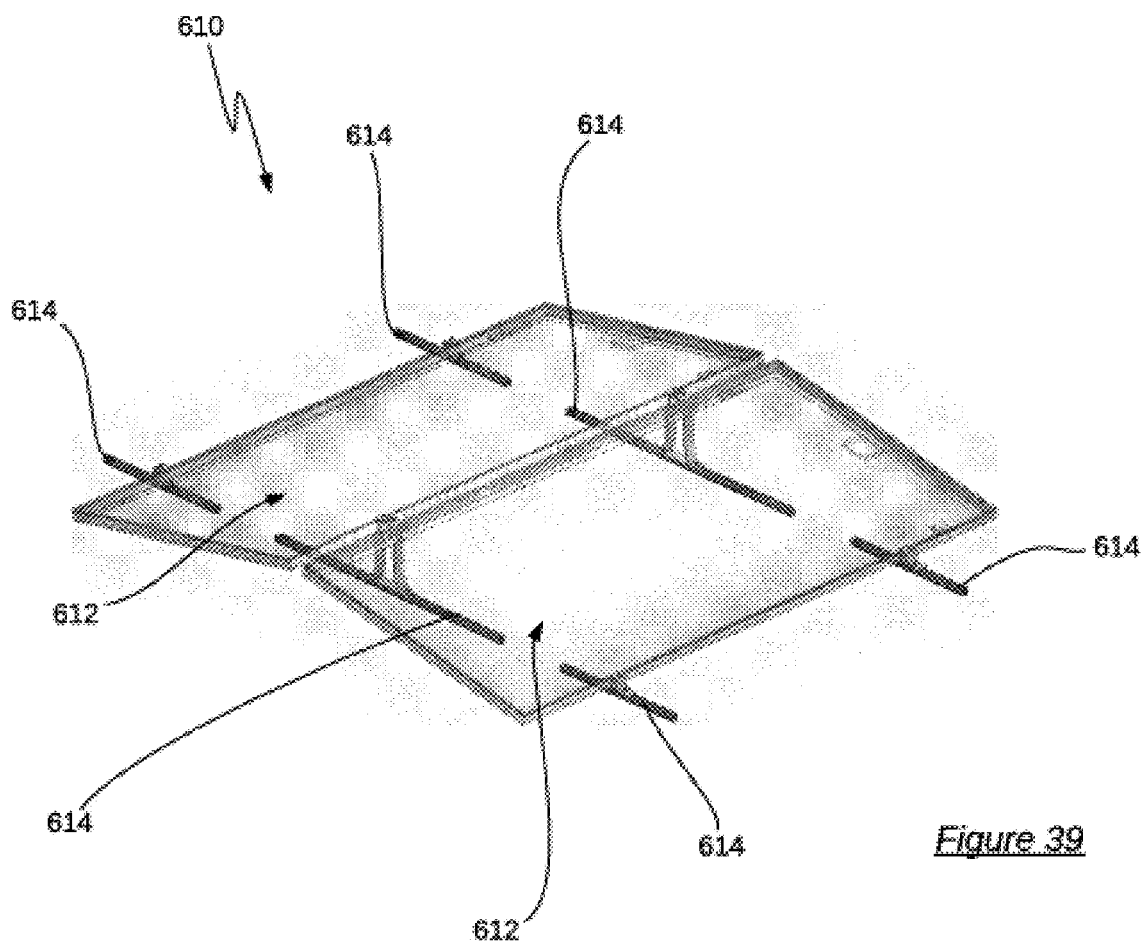
FIG. 39: is perspective view of the photovoltaic assembly of FIG. 38, in which the modules are shown partially transparent.
Figure 40:
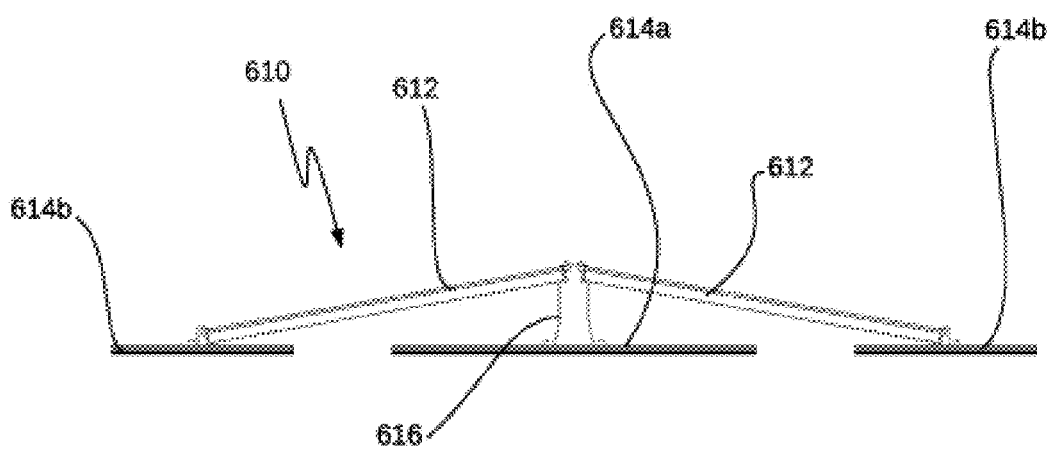
FIG. 40: is an end view of the photovoltaic assembly of FIG. 38.
Figure 41:
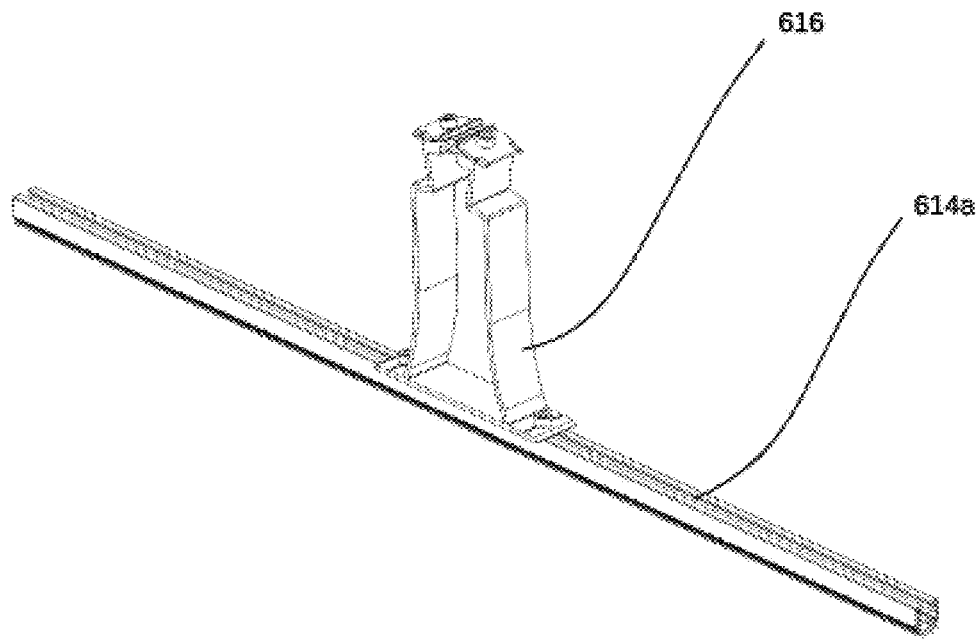
FIG. 41: is a perspective view of a central support portion of the assembly of FIG. 38.
Figure 42:
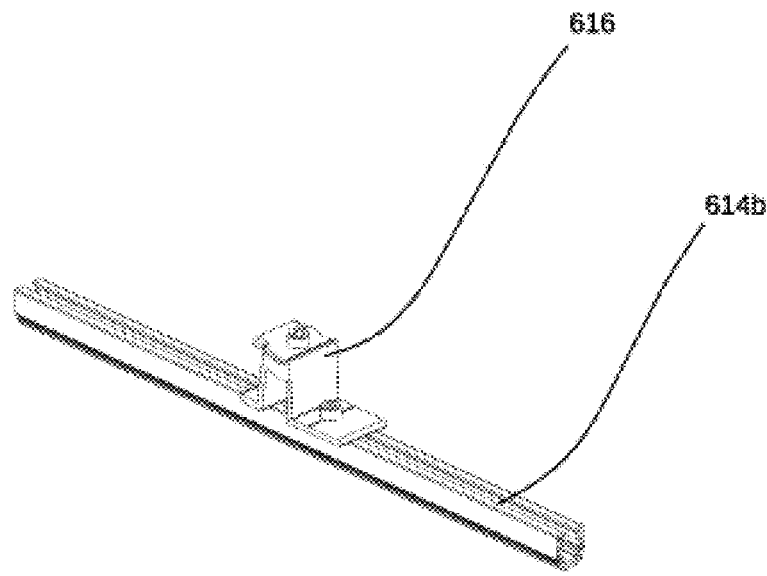
FIG. 42: is a perspective view of an outer support portion of the assembly of FIG. 38.

FIG. 37 shows a transport assembly for transporting solar photovoltaic assemblies, such as those of the embodiment shown in FIG. 1. The transport assembly of FIG. 37 is in the form of a trailer 500 that has a deck 502. The trailer 500 is configured to carry twenty assemblies 10 in their stowed configurations simultaneously. These assemblies are supported on the deck 502 in two sets of ten, in a fore-and-aft arrangement.

The trailer 500 has a set of restraints (not shown) on the deck 502, and a peripheral frame 504. In some alternative embodiments, the trailer can include a central internal frame, with assemblies mountable on opposing lateral sides of frame. The assemblies are carried in an inclined inwardly position.

Each restraint receives part of the central support portion of one of the assemblies. Thus, the assemblies 10 are appropriately held on the deck. The peripheral frame 504 is spaced vertically above the deck 502 by end frames 506, and follows the outer edges of the deck 502. The trailer 500 further has cross beams (not shown) that are removably connectable to the peripheral frame 504. The cross beams are configured to engage the support structures of the assemblies 10. The peripheral frame 504 and cross beams provide lateral support to the assemblies 10 that are loaded onto the trailer 500.

FIGS. 38 to 42 show a solar photovoltaic assembly 610 according to an eighth embodiment of the invention. The assembly 610 of this embodiment has two solar photovoltaic modules 612, and a mounting system for mounting the modules 612 on a surface of a building.

The mounting system of the assembly 610 includes feet 614 that are each configured to affix to a surface of a building, such as the external surface of a roof. Further, once the feet 614 are affixed to a surface, each foot 614 resists disengagement from that surface. The assembly 610 of this embodiment has six feet 614. Two central feet 614a support adjacent edges of the two modules 612. Two pairs of outer feet 614b support outer edges of the modules 612, and thus opposing edges of the assembly 610.

The mounting system also includes connectors 616. Each connector 616 interconnects one of the feet 614 with the modules 612. Each module 612 is secured relative to the feet 614 by the connectors 616.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A solar photovoltaic assembly comprising:
   a plurality of solar photovoltaic modules that are arranged into at least two sets, with each set having one or more of the modules; and
   a support structure on which the modules are mounted, the support structure including:
   at least one central support portion, the sets of photovoltaic modules being mounted to the support structure so as to be movable relative to the central support portion between a stowed configuration in which the sets are positioned with at least one edge of each set being disposed adjacent a peripheral edge of another set,
   for each set of modules, vectors normal to the plane of the modules are oriented towards the modules in the other set such that photovoltaic cells of the modules face towards one another, and
   the planes of the modules are substantially parallel with one another, and
   a deployed configuration in which the photovoltaic modules are arranged relative to one another for simultaneously receiving solar energy and the assembly adopts a general A-frame arrangement, wherein the central support portion defines one or more pivot axes, and each set is mounted to the central support portion so as to rotate about a respective one of the pivot axes when moving between the stowed and deployed configurations; and
   a plurality of feet, each of which being configured to affix to an external surface of a building and then to resist disengagement from that external surface, a first subset of the feet being provided to affix the central support portion to the external surface of the building, and one or more second subsets of the feet that are arranged to affix a respective one of the sets of modules to the building, each second subset of feet being spaced from the first subset of feet,
   wherein each of the plurality of feet includes a piece of compressible foam, and an adhesive material is disposed on an underside surface of the compressible foam, whereby the adhesive material on the underside surface of the compressible foam is to affix to the external surface of the building.

2. The solar photovoltaic assembly according to claim 1, wherein the plurality of feet are elongate, and the support structure further comprises:
   an elongate central beam that is connected or connectable to the central support portion, wherein in the installed assembly the central beam is to be positioned to extend obliquely across the first subset of feet;
   one or more elongate outer beams that are each connected or are connectable to one of the sets of modules at a location spaced from the central beam, wherein in the installed assembly each outer beam is to be positioned to extend obliquely across a respective one of the second subsets of feet;
   and a plurality of joiners that each interconnect a respective one of the feet with a respective one of the beams, and secure the relative position of the respective foot and beam.

3. The solar photovoltaic assembly according to claim 1, wherein the central support portion includes a generally elongate central member that is disposed between inner edges of the sets of modules.

4. The solar photovoltaic assembly according to claim 1, wherein the support structure includes an outer support portion for each set of modules, wherein:
   each outer support portion is spaced from the central support portion, and
   each foot in the one or more second subsets of feet is connected to a respective one of the outer support portions.

5. The solar photovoltaic assembly according to claim 1, wherein the support structure further includes spars that are each pivotally connected at an inner end to the central support portion.

6. The solar photovoltaic assembly according to claim 1, wherein the support structure is configured so that, when in the deployed configuration, the assembly adopts a general A-frame arrangement, with an internal pitch angle of the support structure that is less than 20°.

7. The solar photovoltaic assembly according to claim 1, wherein each module has:
   a structural sheet member, and the photovoltaic cells of that module are supported on the structural sheet member, and
   a mounting frame that extends around the periphery of the structural sheet member,
   and wherein the mounting frames of the modules are connected to the support structure.

8. The solar photovoltaic assembly according to claim 1, wherein the support structure includes a plurality of central legs, and each central leg has an upper end that is connected to the central support portion and a lower end that is connected to one of the feet in the first subset of feet.

9. The solar photovoltaic assembly according to claim 1, wherein each set rotates at least 90° about its respective pivot axis when moving between the stowed and deployed configurations.

10. The solar photovoltaic assembly according to claim 1, wherein each set rotates through approximately 100° about its respective pivot axis when moving between the stowed and deployed configurations.

11. The solar photovoltaic assembly according to claim 1, wherein the assembly has a single pivot axis, and the sets are mounted to the central support portion so as to rotate about the pivot axis when moving between the stowed and deployed configurations.

12. A solar photovoltaic assembly comprising:
   a plurality of solar photovoltaic modules that are arranged into at least two sets, with each set having one or more of the modules; and
   a support structure on which the modules are mounted, the support structure including:

at least one central support portion, an outer support portion for each set of modules, wherein each outer support portion is spaced from the central support portion, the sets of photovoltaic modules being mounted to the support structure so as to be movable relative to the central support portion between a stowed configuration in which the sets are positioned with at least one edge of each set being disposed adjacent a peripheral edge of another set, for each set of modules, vectors normal to the plane of the modules are oriented towards the modules in the other set such that photovoltaic cells of the modules face towards one another, and the planes of the modules are substantially parallel with one another, and a deployed configuration in which the photovoltaic modules are arranged relative to one another for simultaneously receiving solar energy and the assembly adopts a general A-frame arrangement, wherein the central support portion defines one or more pivot axes, and each set is mounted to the central support portion so as to rotate about a respective one of the pivot axes when moving between the stowed and deployed configurations; and a plurality of feet, each of which being configured to affix to an external surface of a building and then to resist disengagement from that external surface, a first subset of the feet being provided to affix the central support portion to the external surface of the building, and one or more second subsets of the feet that are arranged to affix a respective one of the sets of modules to the building, each second subset of feet being spaced from the first subset of feet;

wherein each foot in the one or more second subsets of feet is connected to a respective one of the outer support portions.

13. The solar photovoltaic assembly according to claim 12, wherein each set rotates at least 90° about its respective pivot axis when moving between the stowed and deployed configurations.

14. A solar photovoltaic assembly comprising:

a plurality of solar photovoltaic modules that are arranged into at least two sets, with each set having one or more of the modules; and a support structure on which the modules are mounted, the support structure including:

at least one central support portion, the sets of photovoltaic modules being mounted to the support structure so as to be movable relative to the central support portion between a stowed configuration in which the sets are positioned with at least one edge of each set being disposed adjacent a peripheral edge of another set, for each set of modules, vectors normal to the plane of the modules are oriented towards the modules in the other set such that photovoltaic cells of the modules face towards one another, and the planes of the modules are substantially parallel with one another, and a deployed configuration in which the photovoltaic modules are arranged relative to one another for simultaneously receiving solar energy and the assembly adopts a general A-frame arrangement, wherein the central support portion defines one or more pivot axes, and each set is mounted to the central support portion so as to rotate through approximately 100° about its respective pivot axis when moving between stowed and deployed configurations; and a plurality of feet, each of which being configured to affix to an external surface of a building and then to resist disengagement from that external surface, a first subset of the feet being provided to affix the central support portion to the external surface of the building, and one or more second subsets of the feet that are arranged to affix a respective one of the sets of modules to the building, each second subset of feet being spaced from the first subset of feet.

15. The solar photovoltaic assembly according to claim 14, wherein the plurality of feet are elongate, and the support structure further comprises:

an elongate central beam that is connected or connectable to the central support portion, wherein in the installed assembly the central beam is to be positioned to extend obliquely across the first subset of feet;

one or more elongate outer beams that are each connected or are connectable to one of the sets of modules at a location spaced from the central beam, wherein in the installed assembly each outer beam is to be positioned to extend obliquely across a respective one of the second subsets of feet;

and a plurality of joiners that each interconnect a respective one of the feet with a respective one of the beams, and secure the relative position of the respective foot and beam.

16. The solar photovoltaic assembly according to claim 14, wherein the central support portion includes a generally elongate central member that is disposed between inner edges of the sets of modules.

17. The solar photovoltaic assembly according to claim 14, wherein the support structure includes an outer support portion for each set of modules, wherein:

each outer support portion is spaced from the central support portion, and each foot in the one or more second subsets of feet is connected to a respective one of the outer support portions.

18. The solar photovoltaic assembly according to claim 14, wherein the support structure further includes spars that are each pivotally connected at an inner end to the central support portion.

19. The solar photovoltaic assembly according to claim 14, wherein the support structure is configured so that, when in the deployed configuration, the assembly adopts a general A-frame arrangement, with an internal pitch angle of the support structure that is less than 20°.

20. The solar photovoltaic assembly according to claim 14, wherein each module has:

a structural sheet member, and the photovoltaic cells of that module are supported on the structural sheet member, and a mounting frame that extends around the periphery of the structural sheet member, and wherein the mounting frames of the modules are connected to the support structure.

21. The solar photovoltaic assembly according to claim 14, wherein the support structure includes a plurality of central legs, and each central leg has an upper end that is connected to the central support portion and a lower end that is connected to one of the feet in the first subset of feet.

22. The solar photovoltaic assembly according to claim 14, wherein each set rotates at least 90° about its respective pivot axis when moving between the stowed and deployed configurations.

23. The solar photovoltaic assembly according to claim 14, wherein each set rotates through approximately 100° about its respective pivot axis when moving between the stowed and deployed configurations.

24. The solar photovoltaic assembly according to claim 14, wherein the assembly has a single pivot axis, and the sets are mounted to the central support portion so as to rotate about the pivot axis when moving between the stowed and deployed configurations.

* * * * *